(12) United States Patent
Narumi et al.

(10) Patent No.: US 9,881,364 B2
(45) Date of Patent: Jan. 30, 2018

(54) IMAGE PROCESSING APPARATUS, IMAGE PROCESSING METHOD AND COMPUTER READABLE MEDIUM FOR IMAGE ENHANCEMENT

(71) Applicant: FUJI XEROX CO., LTD., Tokyo (JP)

(72) Inventors: Shota Narumi, Kanagawa (JP); Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/226,221

(22) Filed: Aug. 2, 2016

(65) Prior Publication Data
US 2017/0046817 A1    Feb. 16, 2017

(30) Foreign Application Priority Data

Aug. 10, 2015  (JP) .................. 2015-158194
Jan. 26, 2016  (JP) .................. 2016-012547

(51) Int. Cl.
*G06T 5/00*    (2006.01)

(52) U.S. Cl.
CPC .................. *G06T 5/008* (2013.01)

(58) Field of Classification Search
CPC ......... G06T 5/00; G06T 5/008; G06T 7/0085; G06T 7/408; G06T 2207/20112; G06T 2207/20172
See application file for complete search history.

(56) References Cited

U.S. PATENT DOCUMENTS

| 2002/0168094 | A1* | 11/2002 | Kaushikkar | ............. G06F 19/26 382/128 |
| 2012/0106867 | A1* | 5/2012 | Yamada | ............... H04N 1/6027 382/274 |
| 2015/0123985 | A1* | 5/2015 | Abe | ........................ G06T 5/008 345/590 |
| 2015/0312538 | A1* | 10/2015 | Nashizawa | ............ H04N 5/202 348/256 |

FOREIGN PATENT DOCUMENTS

JP    2012-108898 A    6/2012

OTHER PUBLICATIONS

Kimmel et al. ("A Variational Framework for Retinex," International Journal of Computer Vision 52(1), 2003).*

(Continued)

*Primary Examiner* — Yubin Hung
(74) *Attorney, Agent, or Firm* — Sughrue Mion, PLLC

(57) ABSTRACT

An image processing apparatus includes a reflectivity image generation unit that generates a reflectivity image in which a reflectivity component of an original image is used as a pixel value, from the original image, a determining unit that determines a degree of maintenance of at least one of a dark part and a bright part of the original image using the original image and a degree of enhancement of the reflectivity component of the original image and an enhancement image generation unit that generates an enhancement image in which the reflectivity component of the original image is enhanced using the reflectivity image, the degree of enhancement, and the degree of maintenance.

15 Claims, 19 Drawing Sheets

(56) References Cited

OTHER PUBLICATIONS

Wu et al. ("An Improved Image Enhancement Approach Based on Retinex Theory,", IEEE Proceedings of the International Conference on Information Technology and Applications, pp. 67-71, 2013).*

Fu et al. ("A retinex-based enhancing approach for single underwater image," IEEE Proceedings of the International Conference on Image Processing (ICIP), pp. 4572-4576, 2014).*

Tao et al. ("An Illuminance-Reflectance Nonlinear Video Enhancement Model for Homeland Security Applications," IEEE Proceedings of the 34th Applied Imagery and Pattern Recognition Workshop, 2005).*

Lin et al., Multi-scale retinex improvement for nighttime image enhancement, Image Processing Center, School of Astronautics, Beihang University, Beijing, China, Dec. 7, 2013, pp. 1-16.

* cited by examiner

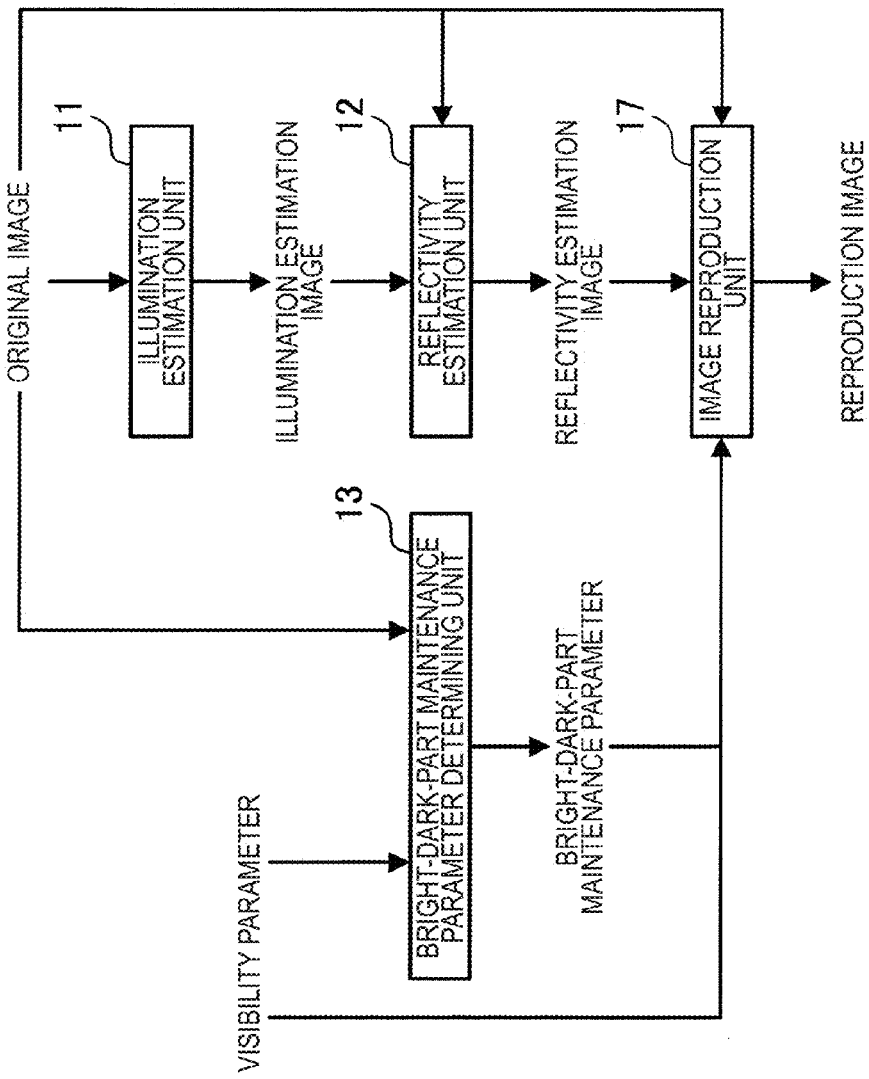

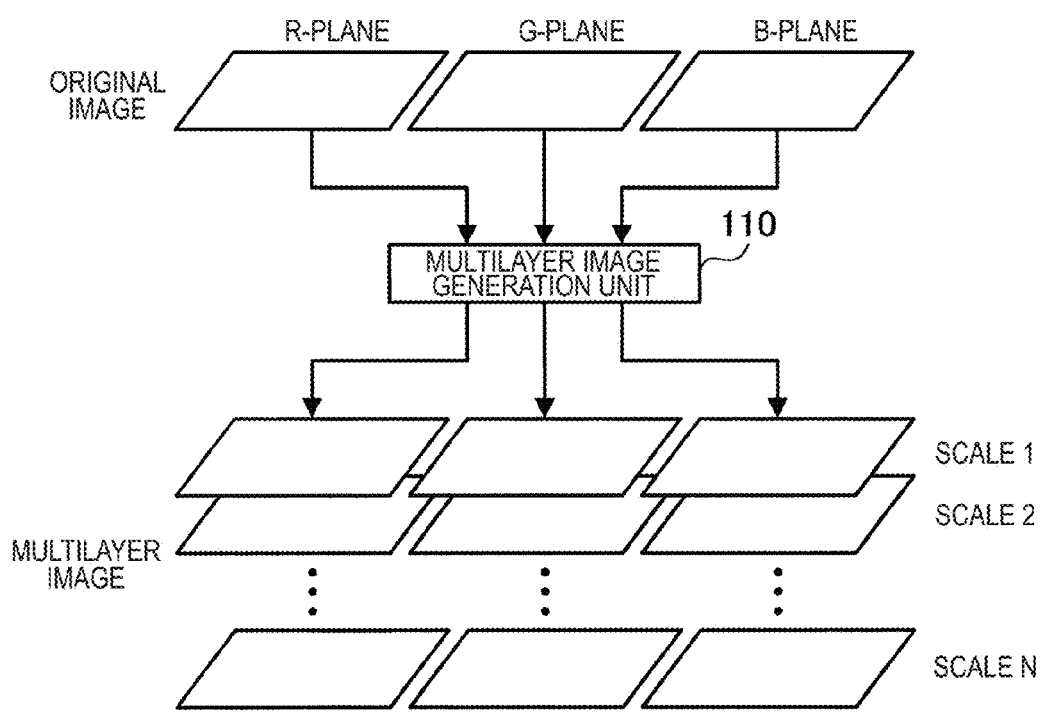

σ = SMALL

σ = MEDIUM

σ = LARGE

| | VISIBILITY | NOISE SUPPRESSION | HIGHLIGHT CLIPPING SUPPRESSION |
|---|---|---|---|
| HIGH | ● | ○ | ○ |
| MEDIUM | ○ | ● | ○ |
| LOW | ○ | ○ | ● |

IMAGE PROCESSING APPARATUS, IMAGE PROCESSING METHOD AND COMPUTER READABLE MEDIUM FOR IMAGE ENHANCEMENT

CROSS-REFERENCE TO RELATED APPLICATIONS

This application is based on and claims priority under 35 USC 119 from Japanese Patent Application Nos. 2015-158194 filed on Aug. 10, 2015, and 2016-012547 filed on Jan. 26, 2016.

BACKGROUND OF THE INVENTION

1. Technical Field

The present invention relates to an image processing apparatus, an image processing method, and a computer readable medium storing an image processing program.

2. Related Art

A known image processing apparatus includes an illumination light component estimation unit that calculates an estimated illumination light component of an original image, an estimated illumination light component correction unit that outputs a corrected estimated illumination light component obtained by correcting the estimated illumination light component, a Retinex processing unit that corrects a brightness component by dividing the brightness component of the original image by the corrected estimated illumination light component, and a gain adjustment unit that adjusts the gain of the corrected brightness component (for instance, see JP-A-2012-108898). The estimated illumination light component correction unit converts an estimated illumination light component having a value from 0 to a reference value to a maximum value of the corrected estimated illumination light component, converts an estimated illumination light component having a value larger than the reference value such that the value of the corrected estimated illumination light component is larger than the value of the estimated illumination light component, and uses such a property that the rate of increase in the corrected estimated illumination light component decreases as the value of the estimated illumination light component increases.

SUMMARY OF THE INVENTION

According to an aspect of the invention, an image processing apparatus includes a reflectivity image generation unit that generates a reflectivity image in which a reflectivity component of an original image is used as a pixel value, from the original image, a determining unit that determines a degree of maintenance of at least one of a dark part and a bright part of the original image using the original image and a degree of enhancement of the reflectivity component of the original image and an enhancement image generation unit that generates an enhancement image in which the reflectivity component of the original image is enhanced using the reflectivity image, the degree of enhancement, and the degree of maintenance.

BRIEF DESCRIPTION OF THE DRAWINGS

Exemplary embodiments of the present invention will be described in detail based on the following figures, wherein:

FIG. 1 is a block diagram illustrating an instance of a functional configuration of an image processing apparatus according to a first exemplary embodiment of the invention;

FIG. 2 is a diagram illustrating how multilayer images are generated by a multilayer image generation unit when an original image is a RGB image;

DETAILED DESCRIPTION OF THE INVENTION

Figure 3A:
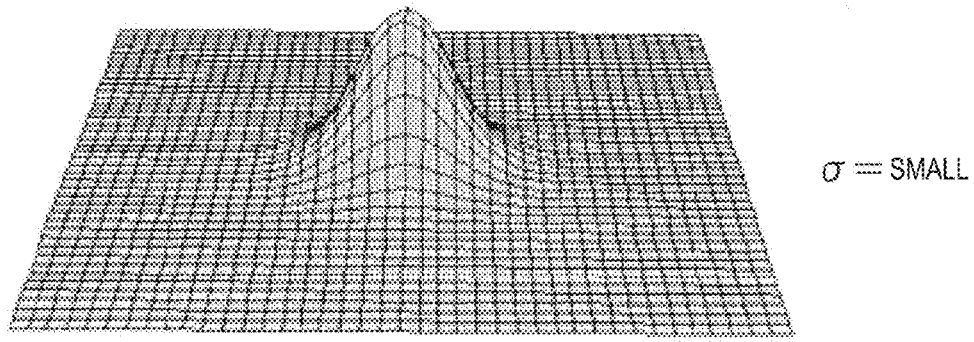
FIGS. 3A to 3C are diagrams illustrating that the frequencies of images of respective layers of multilayer images are different depending on the value of σ.

Hereinafter, exemplary embodiments of the invention will be described in detail with reference to the accompanying drawings.

Background of Exemplary Embodiment

Generally, an operation of making a document with images is performed while looking at a monitor of a PC (personal computer). In such an operation, users who use Information and Communication Technology (ICT) devices such as tablet computers and the like which have been popular in these days are increasing.

In general, change of environmental light scarcely has an effect on the users in an office environment like a place for clerical work or a Desk Top Publishing (DTP) work. On the other hand, while the ICT devices that are comfortably portable have a merit of enabling users to work anywhere, the ICT devices also have the demerit of being affected by circumstances where the devices are carried, such as change of environmental light.

In an operation of using images, other than the above-described operation of making the document, a user may perform an operation of storing images which are captured by users with a camera-equipped tablet and the like in each device. Such a scene where users share images each other and explain a situation with images has become common.

As described above, features such as "easily usable" and "usable in various places" are exemplified as the features of the recent monitor environment, which is different from the related-art monitor environment. In the recent monitor environment, "visibility" is more focused than color adjusting since the using method and the usage environment are different from those in the related-art monitor environment.

The term "visibility" is a characteristic regarding whether a visual object can be viewed clearly. Basic methods in the field of image processing represented by Gamma correction, histogram equalization, dynamic range compression and the like are provided as a method for improving the visibility of an image.

In gamma correction, a curve which enhances a dark portion or a target is generated and is applied to a pixel value, whereby the dark portion is brightened. In histogram equalization, a curve which removes eccentricity of the histogram of an image is generated and is applied to a pixel value, whereby reproduction in which a histogram is smoothed is performed. In dynamic range compression, a low brightness and a high brightness are represented without lowering a contrast by changing a correction amount in accordance with an ambient brightness of the image.

There is a method employing Retinex principle as a method of improving visibility using a visual feature. The Retinex principle is a basic principle for improving visibility by enhancing the reflectivity components based on the idea that a human perceives scenes by reflectivity.

In the Retinex process, it is necessary to estimate an illumination component to estimate the reflectivity component. Currently, it is common to use a smoothed image as the illumination component. Instances of a method which uses the smoothed image include Single-Scale Retinex (SSR) which uses a single smoothed image and Multi-Scale Retinex (MSR) and Integrated Multi-Scale Retinex (IMSR) which use plural smoothed images. Since SSR uses a single smoothed image, if the degree of smoothing is small, noise may occur in a dark region. Moreover, if the degree of smoothing is large, an unnatural strip-shaped defect (halo effect) may occur at a boundary region where a brightness difference is large. In contrast, since MSR and IMSR use multilayer smoothed images, the occurrence of noise and the halo effect is suppressed.

However, according to MSR and IMSR, if the degree of enhancement (reproduction parameter) of the reflectivity component is increased, noise or highlight clipping may occur depending on an image.

Therefore, in this exemplary embodiment, a dark or bright-part maintenance parameter for suppressing noise or highlight clipping is controlled according to a visibility parameter and brightness information of an image. That is, a final degree of enhancement is changed by changing the dark or bright-part maintenance parameter according to the visibility parameter even when pixels have the same values.

Moreover, due to physical characteristics of a person, shades are formed in the boundary between the neck and the outline of the face, the bent portions of the arms and the legs, and the like. When such shades are present, a pseudo contour may occur during the Retinex process. The pseudo contour is more likely to be noticeable as the visibility parameter increases and gives an unnatural impression. For instance, the more the visibility improved by increasing the visibility parameter, the more the pseudo contour of the skin part becomes likely to be noticeable.

Therefore, in this exemplary embodiment, a skin-part maintenance parameter for suppressing a pseudo contour is controlled according to the level of visibility to be reproduced. That is, a final degree of enhancement is changed by changing the skin-part maintenance parameter according to the visibility parameter even when pixels have the same values.

First Exemplary Embodiment

FIG. 1 is a block diagram illustrating an instance of a functional configuration of an image processing apparatus 10 according to a first exemplary embodiment of the invention. As illustrated in FIG. 1, the image processing apparatus 10 of this exemplary embodiment includes an illumination estimation unit 11, reflectivity estimation unit 12, a brightdark-part maintenance parameter determining unit 13, and an image reproduction unit 17.

When a pixel value at a position (x, y) of an original image is I(x, y) and an illumination component is $I_L(x, y)$, the illumination estimation unit 11 estimates $I_L(x, y)$ based on I(x, y) (hereinafter, an image having the estimated illumination component is referred to as an "illumination estimation image"). As one of the characteristics of visual recognition, it is known that the amount of perception at one point (one pixel in an image) of light entering the retina has an influence on the average of peripheral brightness around the one point. The peripheral brightness corresponds to the estimated illumination component, and the illumination component is estimated by performing convolution represented by a moving average method or the Gauss function.

$$G(x, y) = k \exp\left(-\frac{x^2 + y^2}{\sigma^2}\right) \quad \text{[Expression 1]}$$

Here, x and y represent the position of a certain pixel, k represents a coefficient for normalizing such that the result of integration with pixels corresponding to a filter size of image processing becomes 1, and σ represents the degree of smoothing (scale). The above-described function is only an instance, and any filter capable of consequently smoothing an image may be used. For instance, there is a bilateral filter that is a filter by a modified function of Expression 1 and is known as a smoothing filter that performs edge preservation, and the bilateral filter may be used.

According to the Retinex principle, it is known that a human visual characteristic of estimating illumination light from the periphery of a region of interest. Thus, a smoothed image represents the estimated illumination light. However, since a suitable scale varies depending on a scene, for instance, it is preferable that the estimation of the illumination light is performed by a weighted sum of images of N layers from a scales 1 to N, as follows.

$$I_L(x, y) = \sum_{n=1}^{N} W_n G_n(x, y) \otimes I(x, y) \quad \text{[Expression 2]}$$

Here, $I_L(x, y)$ represents a pixel value of an illumination estimation image, $G_n(x, y)$ represents Expression 1 for the scale n, I(x, y) represents a pixel value of the brightness image, $W_n$ represents a weight for the scale n, and the symbol with "x" surrounded by "O" represents a convolution. Note that $W_n$ may be simply set to 1/N, or may be set to variable according to the layer.

Figure 3B:
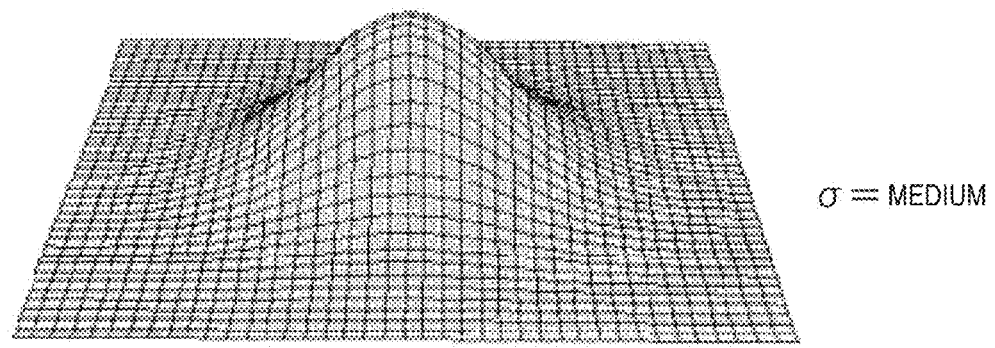
Figure 3C:
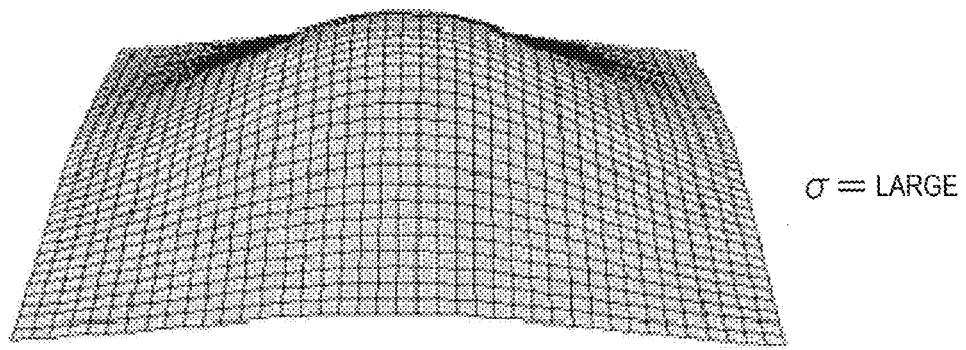

FIG. 2 illustrates how multilayer images are generated by a multilayer image generation unit 110 in the illumination estimation unit 11. FIG. 2 illustrates an instance in which images of N layers of the scales 1 to N are generated as multilayer images when an original image is composed of three RGB planes. Here, since the layers of the scales 1, 2, . . . , and N are layers obtained by changing σ in Expression 1, the degrees of smoothing are different. As illustrated in FIGS. 3A to 3C, the frequency of an image changes when σ is changed. Specifically, the image has a high frequency when σ is small as illustrated in FIG. 3A, the image has a low frequency when σ is large as illustrated in FIG. 3C, and the image has a medium frequency when σ is medium as illustrated in FIG. 3B.

Figure 4:
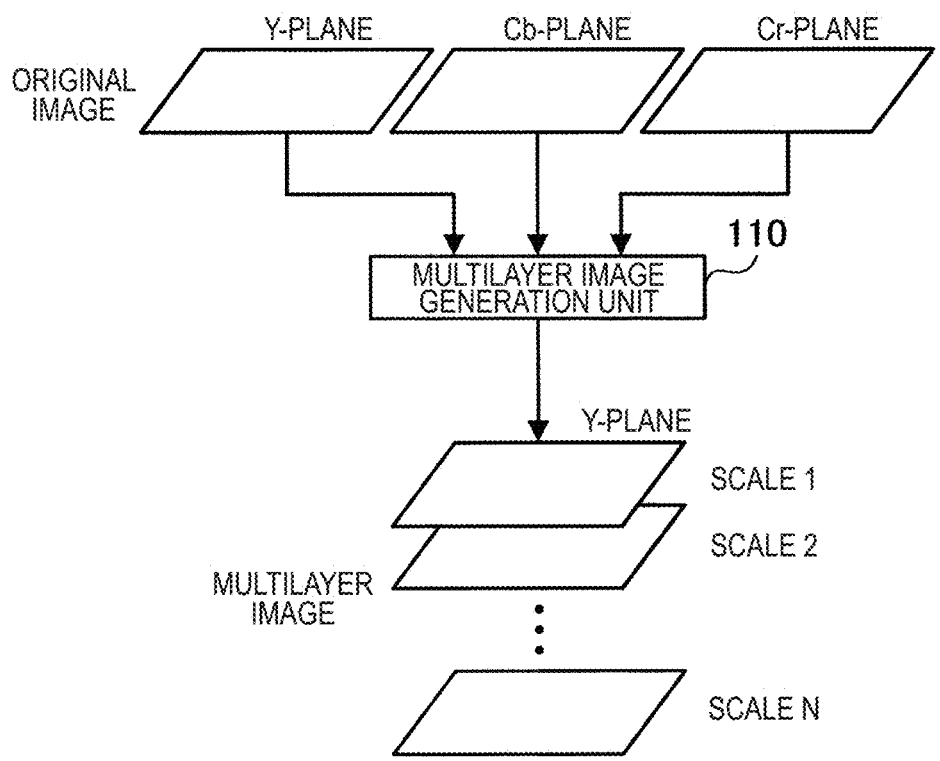
FIG. 4 is a diagram illustrating how multilayer images are generated by a multilayer image generation unit when an original image is a brightness-chromaticity image.

As described above, although the multilayer images may include N layers of the three RGB planes, the multilayer images may have a configuration as illustrated in FIG. 4. FIG. 4 illustrates an instance in which the RGB image is converted in advance to a brightness-chromaticity image like an YCbCr image. In this instance, only the Y plane representing Y is converted to multilayer images. This is because there is a case in which the illumination component is estimated only using the brightness. In this instance, although an YCbCr color space is used as a color space represented by brightness and chromaticity, an L*a*b* color space, a HSV color space (HS is converted to a chromaticity coordinate), and the like may be used. When L* is used as a brightness image when the L*a*b* color space is used and V is used as a brightness image when the HSV color space is used. Moreover, the image of the layer of one scale used in SSR may be used as an illumination estimation image.

In this exemplary embodiment, an illumination estimation image is used as an instance of an illumination image having an illumination component of an original image as a pixel value, and the illumination estimation unit 11 is provided as an instance of an illumination image generation unit that generates an illumination image.

The reflectivity estimation unit 12 estimates the reflectivity of an original image by calculating the ratio of a pixel value of an original image to a pixel value of the illumination estimation image. Specifically, the reflectivity estimation unit 12 calculates an image (hereinafter referred to as a "reflectivity estimation image") having the following reflectivity.

$$I_R(x, y) = \frac{I(x, y)}{I_L(x, y)} \quad \text{[Expression 3]}$$

Here, I(x, y) represents a pixel value of an original image. $I_L(x, y)$ represents a pixel value of an illumination estimation image, and $I_R(x, y)$ represents a pixel value of a reflectivity estimation image. When the illumination estimation images are calculated for the respective three RGB planes, Expression 3 is to be analyzed such that $I_R(x, y)$ may be provided for the three RGB planes. Moreover, when only the brightness component (Y in YCbCr, L in L*a*b*, and V in HSV) is used, Expression 3 may be used for one plane.

In this exemplary embodiment, a reflectivity estimation image is used as an instance of reflectivity image having an a reflectivity component of an original image as a pixel value, and the reflectivity estimation unit 12 is provided as an instance of reflectivity image generation unit that generates a reflectivity image.

The bright-dark-part maintenance parameter determining unit 13 determines a bright-dark-part maintenance parameter based on a visibility parameter and brightness information of an original image. The details thereof will be described below.

The image reproduction unit 17 performs a process of enhancing the reflectivity component based on the original image and the reflectivity estimation image generated by the reflectivity estimation unit 12. For instance, the image reproduction unit 17 generates a reproduction image which enhances the reflectivity component according to the following reproduction expression.

$$\hat{I}(x,y) = \alpha\beta I_R(x,y) + (1-\alpha\beta)I(x,y)$$

$$0 \leq \alpha \leq 1 \quad 0 \leq \beta \leq 1 \quad \text{[Expression 4]}$$

Here, I(x, y) represents a pixel value of an original image, an $I_R(x, y)$ represents a pixel value of an reflectivity estimation image, and Î(x, y) represents pixel value of a reproduction image. Moreover, α is a visibility parameter for enhancing visibility, and β is a bright-dark-part maintenance parameter determined by the bright-dark-part maintenance parameter determining unit 13. Note that the value α changes according to a user's instruction and image characteristics. Instances of the user instruction include a moving amount of a finger on a screen and selecting of a mode. Î(x, y) is the reflectivity component itself when α=1 and β=1 and is a pixel value of the original image when α=0 or β=0. In this description, a symbol "^" is attached to the end of a character in the expression, but is attached above the character in text.

Moreover, a final reproduction parameter is a multiplication of α and β. The reproduction parameter has such characteristics that, when the visibility parameter α is increased, the darker or brighter the pixel, the higher becomes the strength of the bright-dark-part maintenance parameter β. By doing so, dark-part noise or highlight clipping in the bright part is suppressed.

Although several Retinex reproduction expressions are proposed, an arbitrary reproduction expression may be used as long as the expression can change the weight of reflectivity component. For instance, the following expression may be used.

$$Î(x,y) = \alpha\beta \log(I_R(x,y)) + \gamma \quad \text{[Expression 5]}$$

Here, α and β are parameters that represent the gain of reflectivity, and γ is a parameter that represents the intercept of a reproduction expression. FIG. 1 illustrates a case in which the image reproduction unit 17 generates a reproduction image using an original image. However, when Expression 5 is used, the image reproduction unit 17 generates the reproduction image without using the original image. Moreover, although α corresponds to the visibility parameter in FIG. 1 and β corresponds to the bright-dark-part maintenance parameter in FIG. 1, the parameter γ is not used in FIG. 1.

In this exemplary embodiment, a reproduction image is used as an instance of an enhancement image in which the reflectivity component of the original image is enhanced, and the image reproduction unit 17 is provided as an instance of an enhancement image generation unit that generates an enhancement image.

Figure 5:
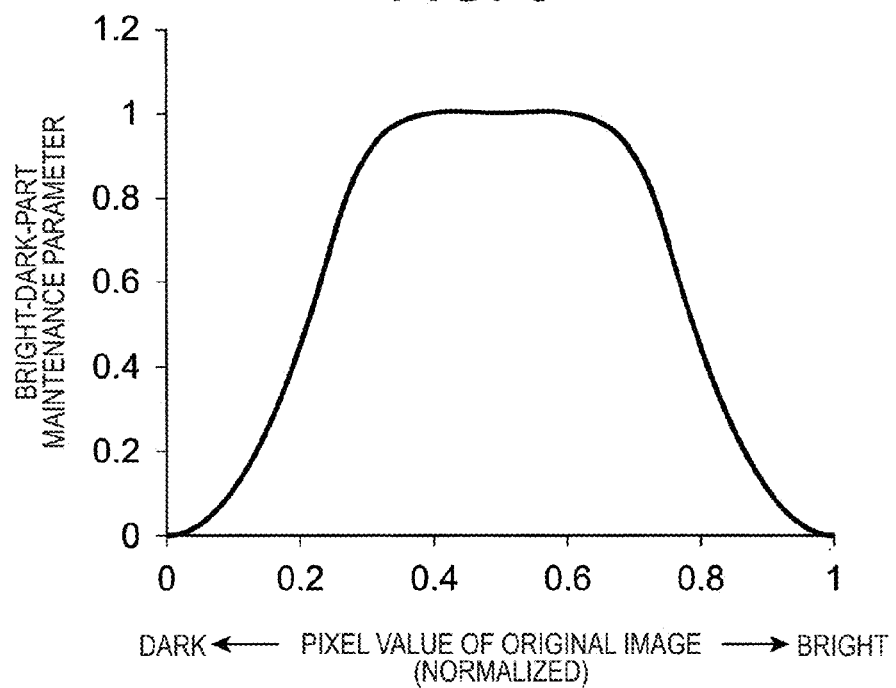
FIG. 5 is a graph illustrating an instance of the relation between a pixel value of an original image and a bright-dark-part maintenance parameter determined according to the first exemplary embodiment of the invention.

Next, the bright-dark-part maintenance parameter determining unit 13 will be described in detail using Expression 4 as an instance. The bright-dark-part maintenance parameter β determined by the bright-dark-part maintenance parameter determining unit 13 is a parameter for suppressing dark-part noise and highlight clipping in the bright part. Basically, as illustrated in FIG. 5, the darker or brighter the pixel, the smaller becomes the bright-dark-part maintenance parameter β. By doing so, since the weight of the original image increases, the states of the dark part and the bright part of the original image are maintained. Thus, the dark-part noise and the highlight clipping in the bright part occurring due to the Retinex process are suppressed. On the other hand, the bright-dark-part maintenance parameter β is set large for intermediate pixel values. By doing so, since the weight of a Retinex reproduction image increases, it is considered that the visibility increases.

For instance, a function represented by the following expression may be used as a function having such characteristics.

$$\beta(I(x,y)) = \frac{\frac{1}{1+\left(\frac{|I(x,y)-0.5|}{K}\right)^T} - K2}{K1} \quad \text{[Expression 6]}$$

$$K1 = \max\left(\frac{1}{1+\left(\frac{|I(x,y)-0.5|}{K}\right)^T}\right) -$$

$$\min\left(\frac{1}{1+\left(\frac{|I(x,y)-0.5|}{K}\right)^T}\right)$$

$$K2 = \min\left(\frac{1}{1+\left(\frac{|I(x,y)-0.5|}{K}\right)^T}\right)$$

Here, T and K are coefficients, and T>0 and K>0. Moreover, K1 and K2 are normalization coefficients. K1 and K2 are defined as described above when β(I(x, y)) is normalized to fall within the range of 0 to 1 for 0<I(x, y)<1.

An arbitrary function such as a convex quadratic function may be used as the function as long as the function has the above-described characteristics.

Figure 6:
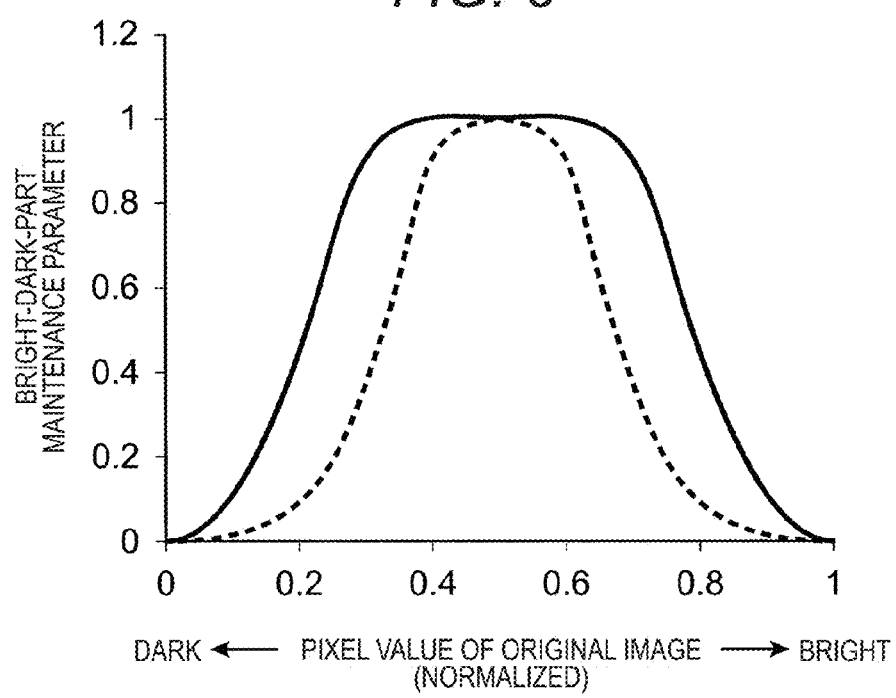
FIG. 6 is a graph illustrating an instance of a change of a bright-dark-part maintenance parameter in relation to a pixel value of an original image when a visibility parameter is large.

Next, a method in which the bright-dark-part maintenance parameter determining unit 13 controls the bright-dark-part maintenance parameter β according to the visibility parameter α will be described with reference to FIG. 6. When the visibility parameter α is large, the dark-part noise and the highlight clipping in the bright part are more likely to be noticeable. Thus, the bright-dark-part maintenance parameter determining unit 13 determines such a bright-dark-part maintenance parameter that the rising is delayed and the falling is quickened as indicated by a broken line in FIG. 6. The use of this bright-dark-part maintenance parameter strengthens the maintenance levels of the bright and dark parts. On the other hand, when the visibility parameter α is small, the dark-part noise and the highlight clipping in the bright part are not likely to be noticeable. Thus, the bright-dark-part maintenance parameter determining unit 13 determines such a bright-dark-part maintenance parameter that, as indicated by a solid line in FIG. 6, the rising is quickened and the falling is delayed as compared to the bright-dark-part maintenance parameter indicated by the broken line. The use of this bright-dark-part maintenance parameter weakens the maintenance levels of the bright and dark parts. In this manner, it is possible to obtain more satisfactory visibility and to suppress the occurrence of noise and highlight clipping by controlling the strength of the bright-dark-part maintenance parameter β according to the strength of the visibility parameter α.

The above-described control of the strength of the bright-dark-part maintenance parameter β according to the strength of the visibility parameter α is represented, for instance, by the following expression in which T in Expression 6 is expressed as a function of α.

$$\beta(I(x,y),\alpha) = \frac{\frac{1}{1+\left(\frac{|I(x,y)-0.5|}{K}\right)^{f(\alpha)}} - K2}{K1} \quad \text{[Expression 7]}$$

$$K1 = \max\left(\frac{1}{1+\left(\frac{|I(x,y)-0.5|}{K}\right)^{f(\alpha)}}\right) -$$

$$K2 = \min\left(\frac{1}{1+\left(\frac{|I(x,y)-0.5|}{K}\right)^{f(\alpha)}}\right)$$

Here, $f(\alpha)>0$ and $K>0$. Moreover, $f(\alpha)$ is a decreasing function since $f(\alpha)$ indicated by the solid line in FIG. 6 is smaller than $f(\alpha)$ indicated by the broken line in FIG. 6. However, in this case, the decreasing function is a function that satisfies the condition "$f(\alpha_1) \geq f(\alpha_2)$ if $\alpha_1 < \alpha_2$". That is, the function may include portions in which the same values appear continuously as long as the values generally decrease.

Thus, $f(\alpha)$ may be represented by the following expression, for instance. In this expression, the visibility parameter $\alpha$ is classified so that $f(\alpha)$ is $s_1$ when the visibility parameter $\alpha$ is smaller than a certain value and $f(\alpha)$ is $s_2$ when the visibility parameter $\alpha$ is larger than the certain value.

$$f(\alpha)=s_1 \ (0 \leq \alpha \leq t_1)$$

$$f(\alpha)=s_2 \ (t_1 < \alpha \leq t_2)$$

$$s_1 > s_2 \quad \text{[Expression 8]}$$

Alternatively, $f(\alpha)$ may be a continuous function. In this case, $f(\alpha)$ may be a linear function of which the inclination is $s_3$ and the intercept is $s_4$ like the following expression, for instance.

$$f(\alpha)=s_3\alpha+s_4$$

$$s_3 < 0 \quad \text{[Expression 9]}$$

In this exemplary embodiment, the visibility parameter is used as an instance of the degree of enhancement of the reflectivity component of the original image. Moreover, the bright-dark-part maintenance parameter is used as an instance of a bright-dark part maintenance degree which is the degree of maintenance of the dark part and the bright part of the original image, and the bright-dark-part maintenance parameter determining unit 13 is provided as an instance of a determining unit that determines the bright-dark part maintenance degree using the original image and the degree of enhancement. However, when the bright-dark part maintenance degree increases, since the weight of the original image becomes higher than that of the reflectivity estimation image in the bright-dark part, the value of the bright-dark-part maintenance parameter decreases.

Second Exemplary Embodiment

Figure 7:
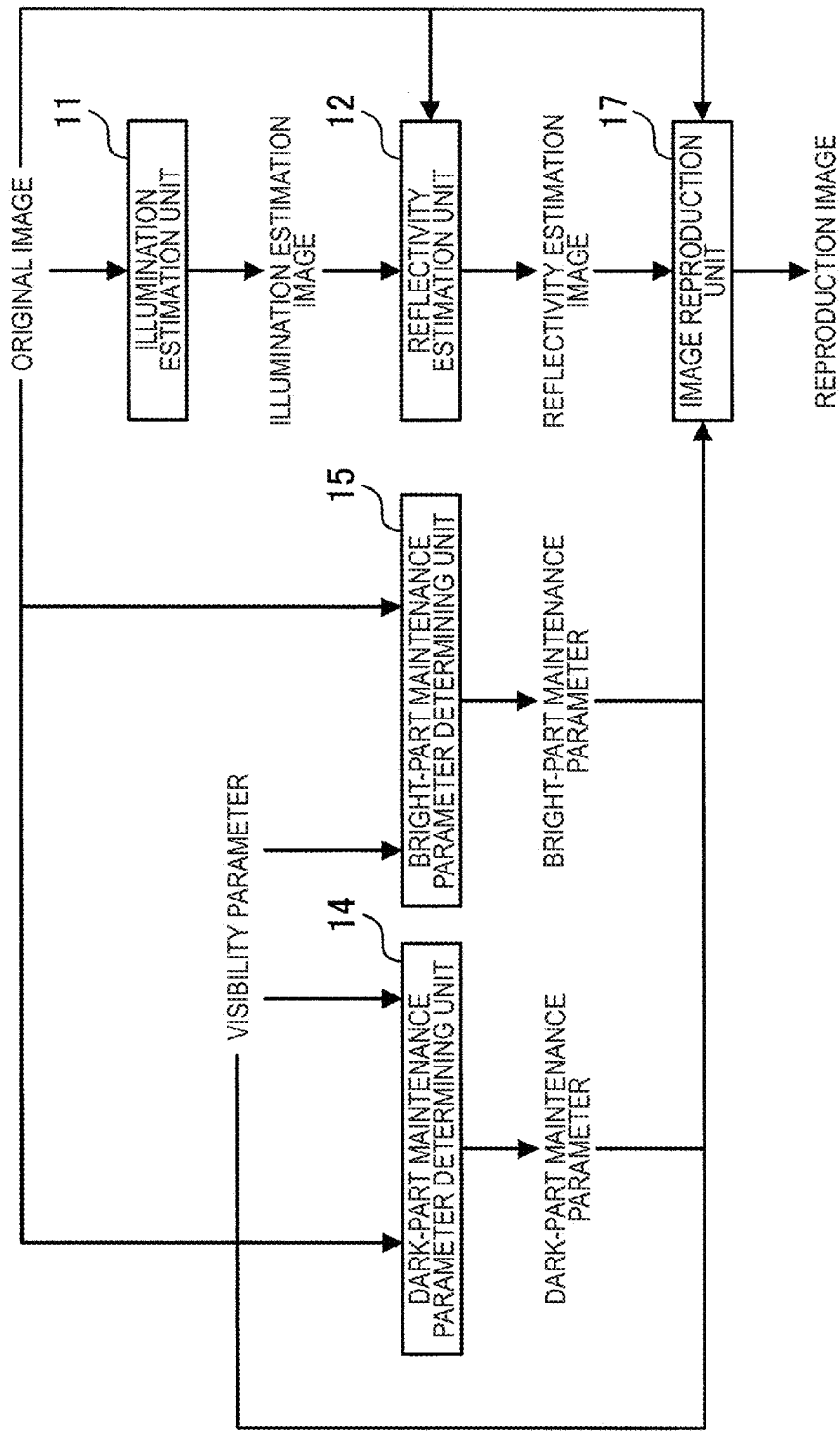
FIG. 7 is a block diagram illustrating an instance of a functional configuration of an image processing apparatus according to a second exemplary embodiment of the invention.

FIG. 7 is a block diagram illustrating an instance of a functional configuration of an image processing apparatus 10 according to the second exemplary embodiment of the invention. As illustrated in FIG. 7, the image processing apparatus 10 of this exemplary embodiment includes an illumination estimation unit 11, reflectivity estimation unit 12, a dark-part maintenance parameter determining unit 14, a bright-part maintenance parameter determining unit 15, and an image reproduction unit 17. Here, since the illumination estimation unit 11 and the reflectivity estimation unit 12 are the same as those of the first exemplary embodiment, the description thereof will not be provided, and the dark-part maintenance parameter determining unit 14, the bright-part maintenance parameter determining unit 15, and the image reproduction unit 17 only will be described. A basic idea of the second exemplary embodiment is that more satisfactory reproduction is performed by determining the dark-part maintenance parameter and the bright-part maintenance parameter using different functions.

The image reproduction unit 17 performs a process of enhancing the reflectivity component based on the original image and the reflectivity estimation image generated by the reflectivity estimation unit 12. For instance, the image reproduction unit 17 generates a reproduction image which enhances the reflectivity component according to the following reproduction expression.

$$\hat{I}(x,y)=\alpha\beta\gamma I_R(x,y)+(1-\alpha\beta\gamma)I(x,y)$$

$$0 \leq \alpha \leq 1 \ \ 0 \leq \beta \leq 1 \ \ 0 \leq \gamma \leq 1 \quad \text{[Expression 10]}$$

Here, $\alpha$ is a visibility parameter for enhancing visibility, $\beta$ is a dark-part maintenance parameter determined by the dark-part maintenance parameter determining unit 14, and $\gamma$ is a bright-part maintenance parameter determined by the bright-part maintenance parameter determining unit 15. $\hat{I}(x,y)$ is the reflectivity component itself when $\alpha=1$, $\beta=1$, and $\gamma=1$ and is a pixel value of the original image when $\alpha=0$, $\beta=0$, or $\gamma=0$.

Moreover, a final reproduction parameter is a multiplication of $\alpha$, $\beta$, and $\gamma$. Moreover, the reproduction parameter has such characteristics that, when the visibility parameter $\alpha$ is increased, the darker the pixel, the higher becomes the strength of the dark-part maintenance parameter $\beta$ and that, when the visibility parameter $\alpha$ is increased, the brighter the pixel, the higher becomes the strength of the bright-part maintenance parameter $\gamma$. By doing so, the final reproduction parameter approaches $\alpha\beta$ in dark pixels and approaches $\alpha\gamma$ in bright pixels.

In this exemplary embodiment, a reproduction image is used as an instance of an enhancement image in which the reflectivity component of the original image is enhanced, and the image reproduction unit 17 is provided as an instance of an enhancement image generation unit that generates an enhancement image.

Next, the dark-part maintenance parameter determining unit 14 and the bright-part maintenance parameter determining unit 15 will be described in detail. The dark-part maintenance parameter determining unit 14 suppresses the dark-part noise while maintaining more satisfactory visibility by changing the characteristics of $\beta$. Moreover, the bright-part maintenance parameter determining unit 15 suppresses the highlight clipping in the bright part while maintaining more satisfactory visibility by changing the characteristics of $\gamma$.

For instance, a function of Expression 11 may be used as a function for determining the dark-part maintenance parameter $\beta$.

$$\beta(I(x,y))=1-(1-I(x,y))^{T1} \quad \text{[Expression 11]}$$

Here, T1 is a coefficient and T1>0.

Figure 8:
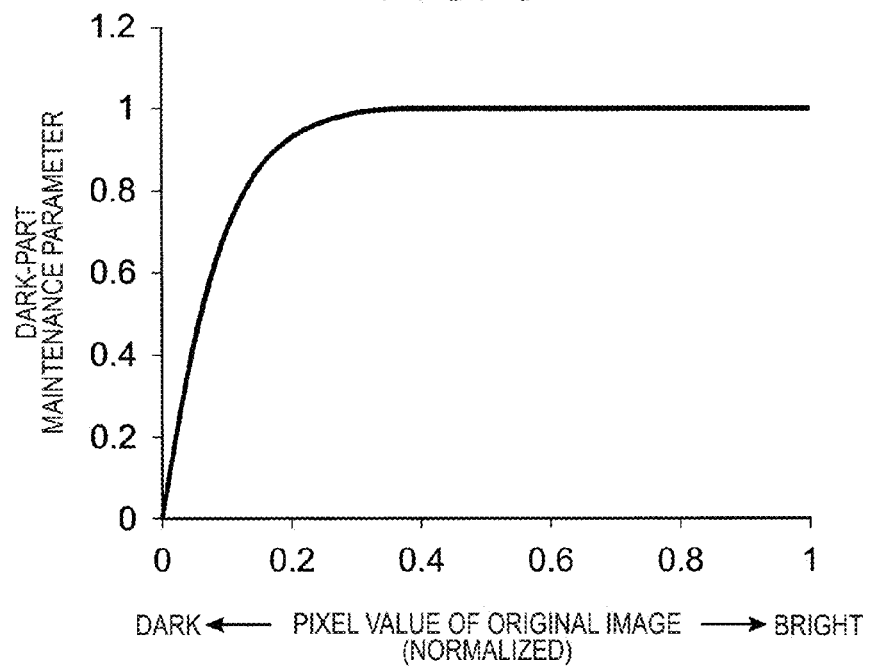
FIG. 8 is a graph illustrating an instance of the relation between a pixel value of an original image and a dark-part maintenance parameter determined according to the second exemplary embodiment of the invention.

As illustrated in FIG. 8, the darker the pixel, the smaller becomes the dark-part maintenance parameter $\beta$. Thus, the contribution of the reflectivity component decreases and the contribution of the original image increases.

Moreover, a function of Expression 12 may be used as a function for determining the bright-part maintenance parameter $\gamma$. Here, T2 and T3 are coefficients and T2>0 and T3>0. The function of Expression 12 is based on a portion in which the pixel value of the original image of a function obtained by inverting the function of FIG. 8 about the axis of the dark-part maintenance parameter is between 0 and 1. However, since the function of Expression 12 in this state has negative values only, normalization is performed such that the range is set to T3 and the intercept is set to +1.

$$\gamma(I(x,y))=T3(1-(1-(-I(x,y)))^{T2})+1 \quad \text{[Expression 12]}$$

Figure 9:
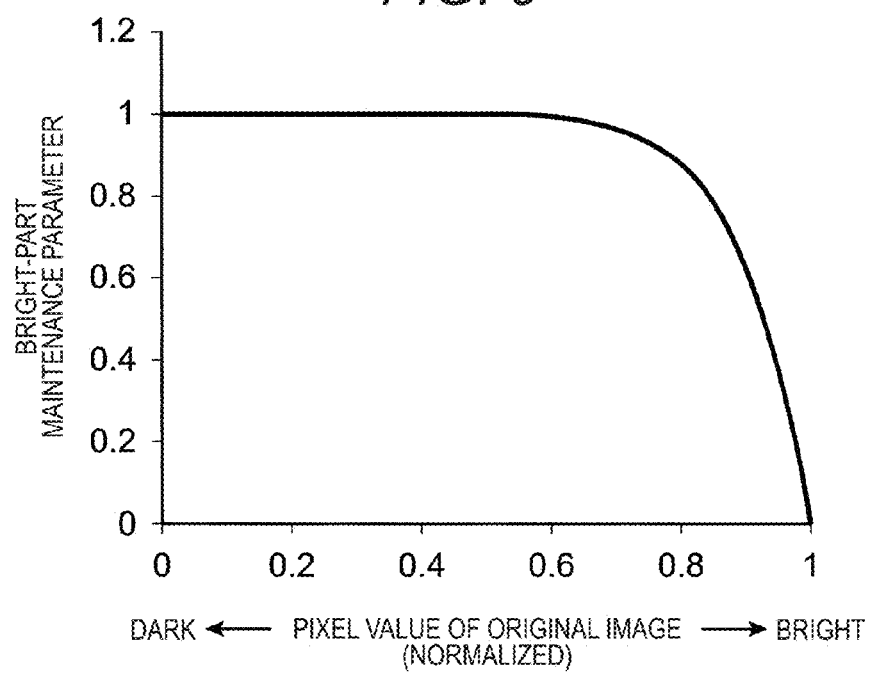
FIG. 9 is a graph illustrating an instance of the relation between a pixel value of an original image and a bright-part maintenance parameter determined according to the second exemplary embodiment of the invention.

As illustrated in FIG. 9, the brighter the pixel, the smaller becomes the bright-part maintenance parameter γ. Thus, the contribution of the reflectivity component decreases and the contribution of the original image increases.

Figure 10:
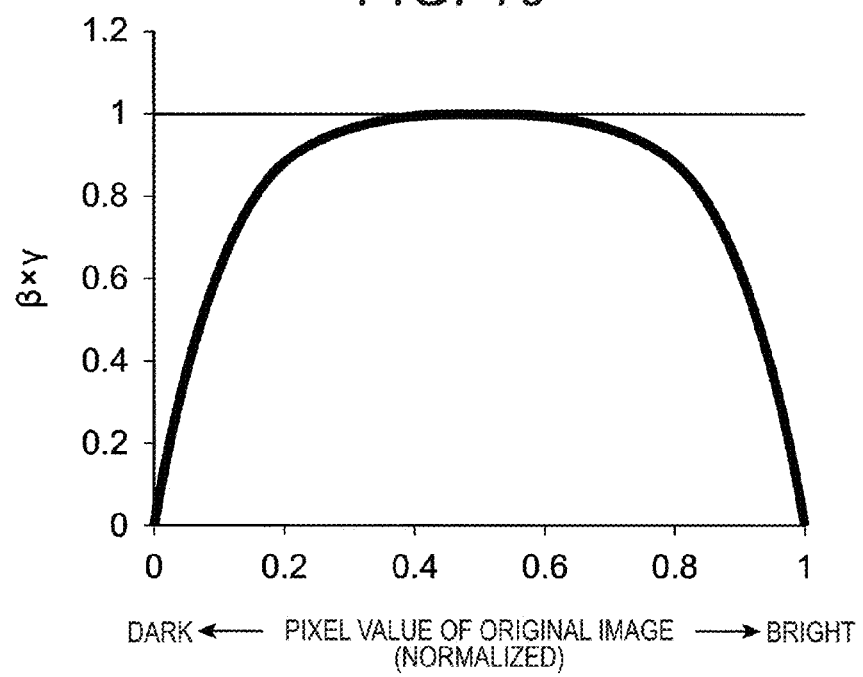
FIG. 10 is a graph illustrating an instance of the relation between a pixel value of an original image and the product of a dark-part maintenance parameter and a bright-part maintenance parameter.

In this way, the pixel value of the original image and the value (dark-part maintenance parameter β)×(bright-part maintenance parameter γ) have such a relation as indicated by a bold line in FIG. 10. That is, this relation is similar to the relation between the pixel value of the original image and the bright-dark-part maintenance parameter β in the first exemplary embodiment.

Figure 11:
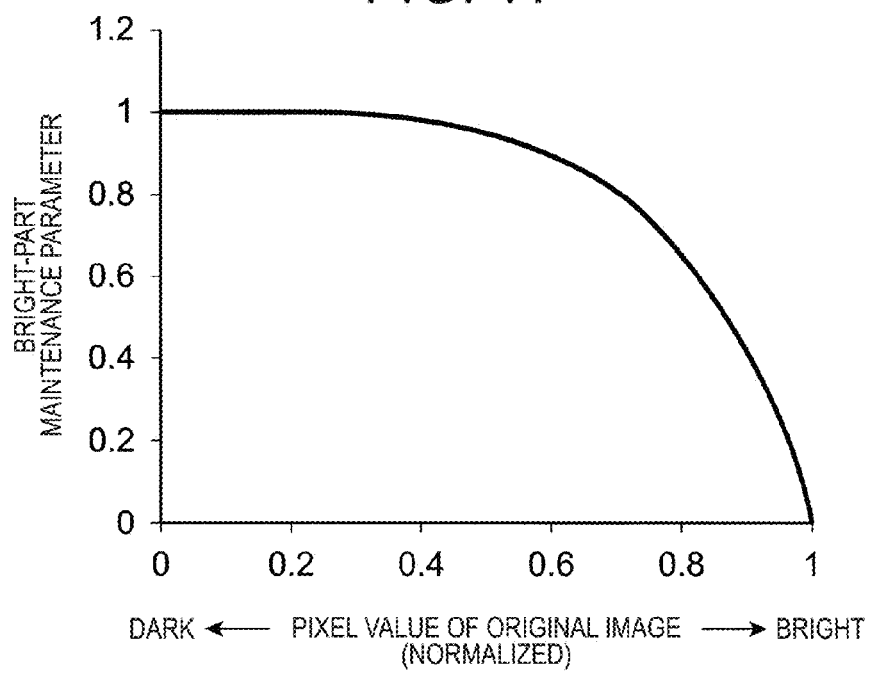
FIG. 11 is a graph illustrating an instance of the relation between a pixel value of an original image and a bright-part maintenance parameter when it is desired to suppress highlight clipping.
Figure 12:
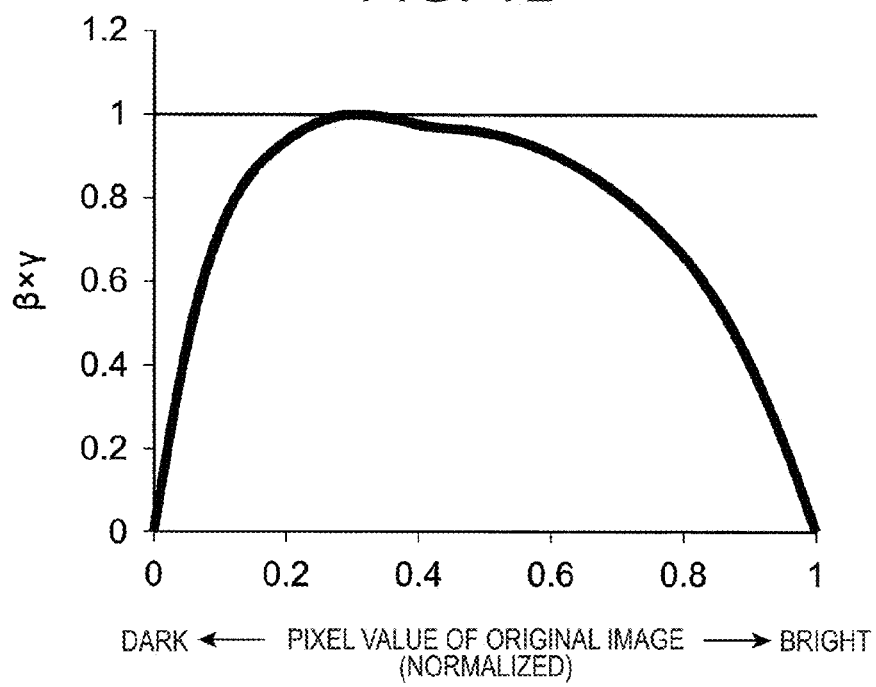
FIG. 12 is a graph illustrating an instance of the relation between a pixel value of an original image and the product of a dark-part maintenance parameter and a bright-part maintenance parameter when it is desired to suppress highlight clipping.

Here, the difference between the second exemplary embodiment and the first exemplary embodiment is that the dark-part maintenance parameter β and the bright-part maintenance parameter γ are controlled independently. For instance, in the shape of FIG. 10, the dark-part maintenance parameter β and the bright-part maintenance parameter γ are set to equivalent strength. In contrast, when it is desired to further suppress highlight clipping, the value T2 in Expression 12 may be decreased. By doing so, as illustrated in FIG. 11, the falling of the curve of the bright-part maintenance parameter is quickened. When the characteristics of the bright-part maintenance parameter and the characteristics of the dark-part maintenance parameter in FIG. 8 are used, the pixel value of the original image and the value (dark-part maintenance parameter β)× (bright-part maintenance parameter γ) have such a relation as indicated by a bold line in FIG. 12. That is, the falling of β×γ is quickened in bright pixels as compared to the shape indicated by the bold line in FIG. 10. Thus, highlight clipping is further suppressed. Moreover, since the dark-part maintenance parameter and the bright-part maintenance parameter are controlled independently, noise is further suppressed.

Next, a method in which the dark-part maintenance parameter determining unit 14 controls the dark-part maintenance parameter β according to the visibility parameter α will be described.

When the visibility parameter α is large, the dark-part noise is more likely to be noticeable. Thus, the dark-part maintenance parameter determining unit 14 determines such a dark-part maintenance parameter that the rising is delayed as indicated by a broken line in FIG. 13. The use of this dark-part maintenance parameter strengthens the maintenance level of the dark part. On the other hand, when the visibility parameter α is small, the dark-part noise is not likely to be noticeable. Thus, the dark-part maintenance parameter determining unit 14 determines such a dark-part maintenance parameter that, as indicated by a solid line in FIG. 13, the rising is quickened as compared to the dark-part maintenance parameter indicated by the broken line. The use of this dark-part maintenance parameter weakens the maintenance level of the dark part. In this manner, by controlling the strength of the dark-part maintenance parameter β according to the strength of the visibility parameter α, it is possible to obtain more satisfactory visibility and to suppress the occurrence of noise.

The above-described control of the strength of the dark-part maintenance parameter β according to the strength of the visibility parameter α is represented, for instance, by the following expression in which T1 in Expression 11 is expressed as a function of α.

$$\beta(I(x,y),\alpha)=1-(1-I(x,y))^{f(\alpha)} \quad \text{[Expression 13]}$$

Figure 13:
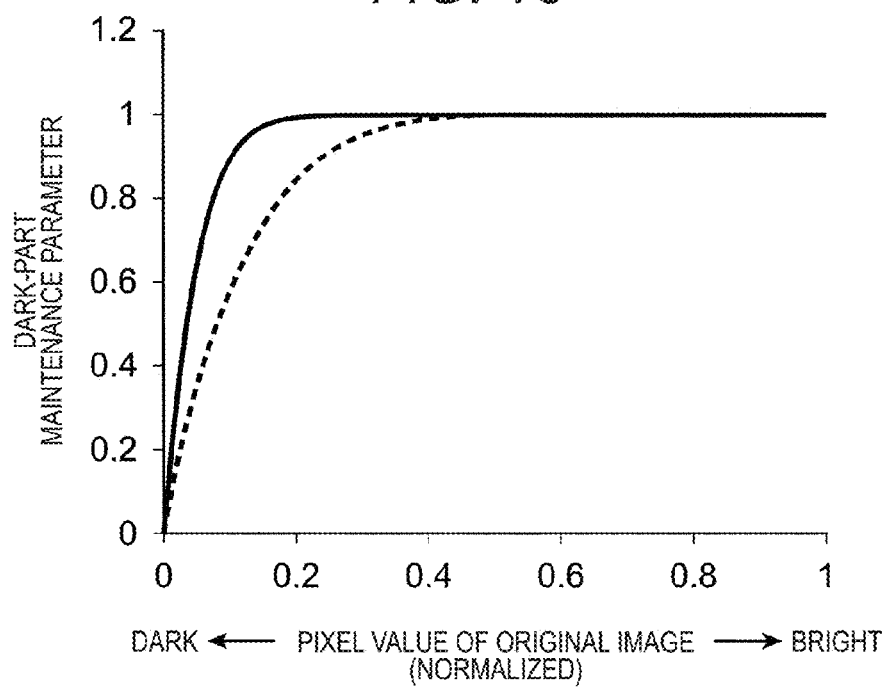
FIG. 13 is a graph illustrating an instance of a change of a dark-part maintenance parameter in relation to a pixel value of an original image when a visibility parameter is large.

Here, f(α)>0. Moreover, f(α) is a decreasing function since f(α) indicated by the solid line in FIG. 13 is smaller than f(α) indicated by the broken line in FIG. 13. However, in this case, the decreasing function is a function that satisfies the condition "f($\alpha_1$)≥f($\alpha_2$) if $\alpha_1$<$\alpha_2$". That is, the function may include portions in which the same values appear continuously as long as the values generally decrease.

Thus, f(α) may be represented by the following expression, for instance. In this expression, the visibility parameter α is classified so that f(α) is $s_1$ when the visibility parameter α is smaller than a certain value and f(α) is $s_2$ when the visibility parameter α is larger than the certain value.

$$f(\alpha)=s_1 \ (0 \leq \alpha \leq t_1)$$

$$f(\alpha)=s_2 \ (t_1 < \alpha \leq t_2)$$

$$s_1 > s_2 \quad \text{[Expression 14]}$$

Alternatively, f(α) may be a continuous function. In this case, f(α) may be a linear function of which the inclination is $s_3$ and the intercept is $s_4$ like the following expression, for instance.

$$f(\alpha)=s_3\alpha+s_4$$

$$s_3 < 0 \quad \text{[Expression 15]}$$

Next, a method in which the bright-part maintenance parameter determining unit 15 controls the bright-part maintenance parameter γ according to the visibility parameter α will be described.

When the visibility parameter α is large, the highlight clipping in the bright part is more likely to be noticeable. Thus, the bright-part maintenance parameter determining unit 15 determines such a bright-part maintenance parameter that the falling is quickened as indicated by a broken line in FIG. 14. The use of this bright-part maintenance parameter strengthens the maintenance level of the bright part. On the other hand, when the visibility parameter α is small, the highlight clipping in the bright part is not likely to be noticeable. Thus, the bright-part maintenance parameter determining unit 15 determines such a bright-part maintenance parameter that as indicated by a solid line in FIG. 14, the falling is quickened as compared to the bright-part maintenance parameter indicated by the broken line. The use of this bright-part maintenance parameter weakens the maintenance level of the bright part. In this manner, by controlling the strength of the bright-part maintenance parameter γ according to the strength of the visibility parameter α, it is possible to obtain more satisfactory visibility and to suppress highlight clipping.

The above-described control of the strength of the bright-part maintenance parameter γ according to the strength of the visibility parameter α is represented, for instance, by the following expression in which T2 in Expression 12 is expressed as a function of α.

$$\gamma(I(x,y),\alpha)=T3(1-(1-(-I(x,y)))^{f(\alpha)})+1 \quad \text{[Expression 16]}$$

Figure 14:
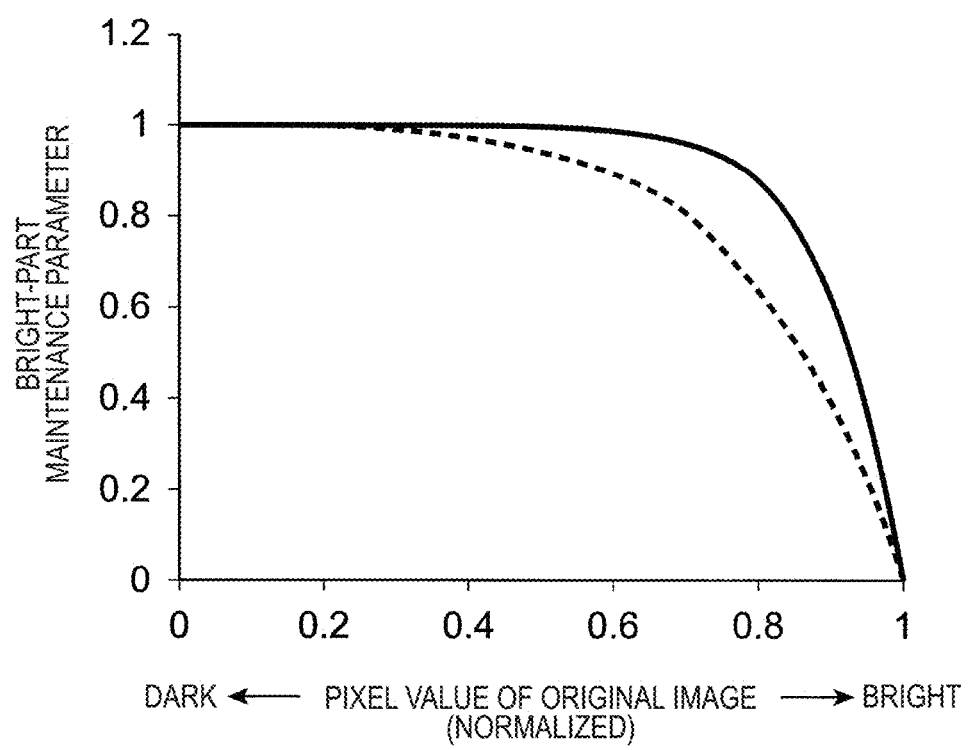
FIG. 14 is a graph illustrating an instance of a change of a bright-part maintenance parameter in relation to a pixel value of an original image when a visibility parameter is large.

Here, f(α)>0. Moreover, f(α) is a decreasing function since f(α) indicated by the solid line in FIG. 14 is smaller than f(α) indicated by the broken line in FIG. 14. However, in this case, the decreasing function is a function that satisfies the condition "f($\alpha_1$)≥f($\alpha_2$) if $\alpha_1$<$\alpha_2$". That is, the function may include portions in which the same values appear continuously as long as the values generally decrease.

Thus, f(α) may be represented by the following expression, for instance. In this expression, the visibility parameter α is classified so that f(α) is $s_1$ when the visibility parameter α is smaller than a certain value and f(α) is $s_2$ when the visibility parameter α is larger than the certain value.

$$f(\alpha)=s_1 \ (0 \leq \alpha \leq t_1)$$

$$f(\alpha)=s_2 \ (t_1 < \alpha \leq t_2)$$

$$s_1 > s_2 \quad \text{[Expression 17]}$$

Alternatively, f(α) may be a continuous function. In this case, f(α) may be a linear function of which the inclination is $s_3$ and the intercept is $s_4$ like the following expression, for instance.

$$f(\alpha)=s_3\alpha+s_4$$

$$s_3 < 0 \quad \text{[Expression 18]}$$

In this exemplary embodiment, the visibility parameter is used as an instance of the degree of enhancement of the reflectivity component of the original image. Moreover, the dark-part maintenance parameter is used as an instance of a dark-part maintenance degree which is the degree of maintenance of the dark part of the original image, and the dark-part maintenance parameter determining unit 14 is provided as an instance of a determining unit that determines the dark-part maintenance degree using the original image and the degree of enhancement. However, when the dark-part maintenance degree increases, since the weight of the original image becomes higher than that of the reflectivity estimation image in the dark part, the value of the dark-part maintenance parameter decreases. Further, the bright-part maintenance parameter is used as an instance of the bright-part maintenance degree which is the degree of maintenance of the bright part of the original image, and the bright-part maintenance parameter determining unit 15 is provided as an instance of a determining unit that determines the dark-part maintenance degree using the original image and the degree of enhancement. However, when the bright-part maintenance degree is high, since the weight of the original image becomes higher than that of the reflectivity estimation image in the bright part, the value of the bright-part maintenance parameter decreases.

Moreover, in this exemplary embodiment, the dark-part maintenance parameter determining unit 14 and the bright-part maintenance parameter determining unit 15 are provided, and the image reproduction unit 17 generates the reproduction image that enhances the reflectivity component using the dark-part maintenance parameter and the bright-part maintenance parameter in addition to the visibility parameter. However, the invention is not limited thereto. Any one of the dark-part maintenance parameter determining unit 14 and the bright-part maintenance parameter determining unit 15 may be provided, and the image reproduction unit 17 may generate the reproduction image that enhances the reflectivity component using any one of the dark-part maintenance parameter and the bright-part maintenance parameter in addition to the visibility parameter. In this respect, the dark-part maintenance parameter determining unit 14 and the bright-part maintenance parameter determining unit 15 are an instance of a determining unit that determines the degree of maintenance of at least one of the dark part and the bright part of the original image.

Third Exemplary Embodiment

Figure 15:
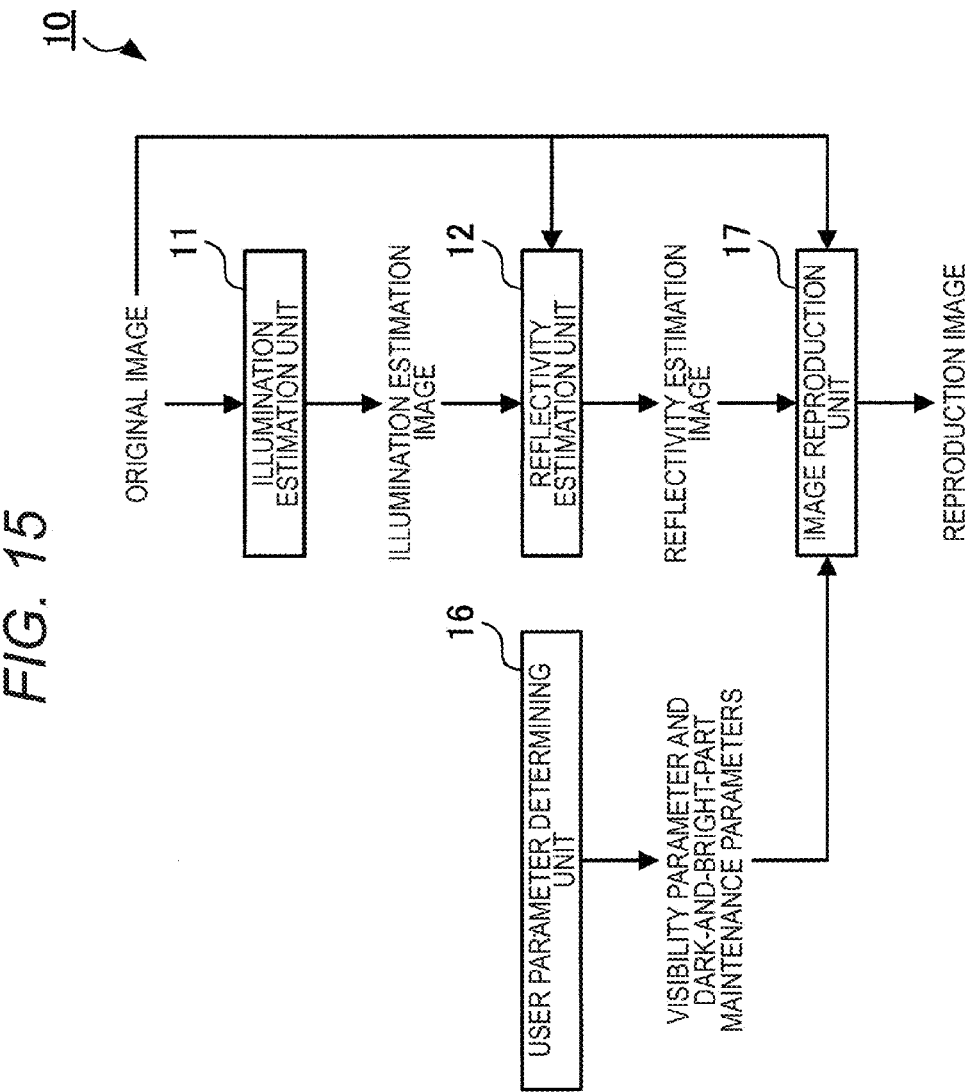
FIG. 15 is a block diagram illustrating an instance of a functional configuration of an image processing apparatus according to a third exemplary embodiment of the invention.

FIG. 15 is a block diagram illustrating an instance of a functional configuration of an image processing apparatus 10 according to a third exemplary embodiment of the invention. As illustrated in FIG. 15, the image processing apparatus 10 according to this exemplary embodiment includes an illumination estimation unit 11, reflectivity estimation unit 12, a user parameter determining unit 16, and an image reproduction unit 17. Here, the illumination estimation unit 11, the reflectivity estimation unit 12, and the image reproduction unit 17 are the same as those of the second exemplary embodiment, the description thereof will not be provided, and the user parameter determining unit 16 only will be described.

The user parameter determining unit 16 determines a visibility parameter, a dark-part maintenance parameter, and a bright-part maintenance parameter according to a user interaction. Although an arbitrary method may be employed as a method of determining the parameters according to a user interaction, two methods will be described below. In this case, although the user (operator) inputs an instruction using a finger, the finger is an instance of an instruction unit, and the user may input an instruction using other arbitrary instruction units such as a touch pen.

A first method determines respective parameters based on a combination of directions indicated by the user.

Figures 16, 17:
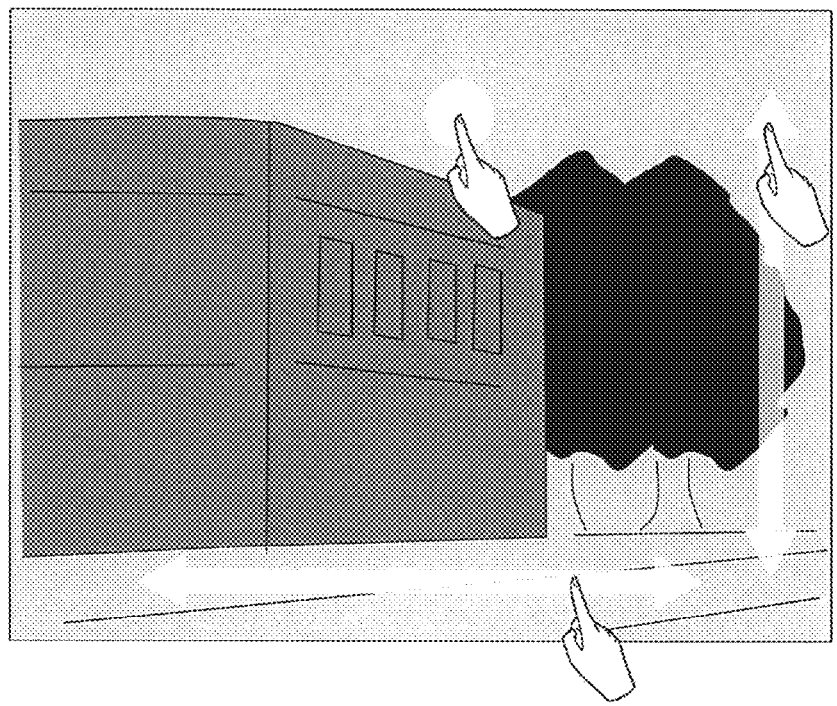
FIG. 16 is a diagram illustrating an instance of a method of determining the strength of each parameter according to a user interaction.
FIG. 17 is a diagram illustrating an instance of a method of determining the strength of each parameter according to a user interaction.

For instance, in FIG. 16, the user changes the strength of the dark-part maintenance parameter by moving his or her finger in a left-right direction on a displayed original image. Specifically, the strength of the dark-part maintenance parameter decreases when the user moves his or her finger to the left, and the strength of the dark-part maintenance parameter increases when the user moves his or her finger to the right.

In FIG. 16, the user changes the strength of the bright-part maintenance parameter by moving his or her finger in an up-down direction on a displayed original image. Specifically, the strength of the bright-part maintenance parameter decreases when the user moves his or her finger to the upper side, and the strength of the bright-part maintenance parameter increases when the user moves his or her finger to the lower side.

In FIG. 16, the user changes the strength of the visibility parameter by inputting a tap operation or a double-tap operation on a displayed original image. Specifically, the strength of the visibility parameter increases when the user inputs a tap operation using his or her finger, and the strength of the visibility parameter decreases when the user inputs a double-tap operation using his or her finger.

Alternatively, although not illustrated in FIG. 16, both the dark-part maintenance parameter and the bright-part maintenance parameter may be controlled by the user moving his or her finger in a diagonal direction on a displayed original image.

In this instance, although the visibility parameter, the dark-part maintenance parameter, and the bright-part maintenance parameter are determined by a user interaction independently, the invention is not limited thereto. That is, the visibility parameter only may be determined according to a tap operation or a double-tap operation. Moreover, the dark-part maintenance parameter and the bright-part maintenance parameter may be determined based on the determined visibility parameter and Expressions 13 and 16 even when the user does not move his or her finger in a left-right direction or an up-down direction.

A second method determines respective parameters according to the selection of an option displayed on the UI of a printer driver or the like.

In FIG. 17, for instance, three strength steps "High," "Medium," and "Low" are displayed as options for each of an item "Visibility" corresponding to the visibility parameter, an item "Noise Suppression" corresponding to the dark-part maintenance parameter, and an item "Highlight Clipping Suppression" corresponding to the bright-part maintenance parameter. The user selects any one of the three strength steps for each item. When the strength is selected as illustrated in FIG. 17, the strength of the visibility parameter is set to a high level, the strength of the dark-part maintenance parameter is set to a medium level, and the strength of the bright-part maintenance parameter is set to a low level. By allowing the user to select any one of the options for each parameter, it is possible to improve the visibility and to suppress the occurrence of durable number of print sheets and highlight clipping while reflecting the preference of the user.

In this instance, although the visibility parameter, the dark-part maintenance parameter, and the bright-part maintenance parameter are determined by a user interaction independently, the invention is not limited thereto. That is, three strength steps for the visibility parameter only may be displayed as options and only the visibility parameter may be determined according to the selection of an option. Moreover, the dark-part maintenance parameter and the bright-part maintenance parameter may be determined based on the determined visibility parameter and Expressions 13 and 16 even when the three strength steps are not displayed as options.

In this exemplary embodiment, the user parameter determining unit 16 is provided as an instance of a setting unit that sets the degree of enhancement.

In FIG. 15, although the user parameter determining unit 16 determines the visibility parameter, the dark-part maintenance parameter, and the bright-part maintenance parameter according to the user interaction as a modification of the second exemplary embodiment, the invention is not limited to this. The visibility parameter and the bright-dark-part maintenance parameter may be determined according to the user interaction as a modification of the first exemplary embodiment. In this case, the visibility parameter may be determined according to the user interaction, and the bright-dark-part maintenance parameter may be determined based on the determined visibility parameter and Expression 7.

Operation of First to Third Exemplary Embodiments

Figure 18:
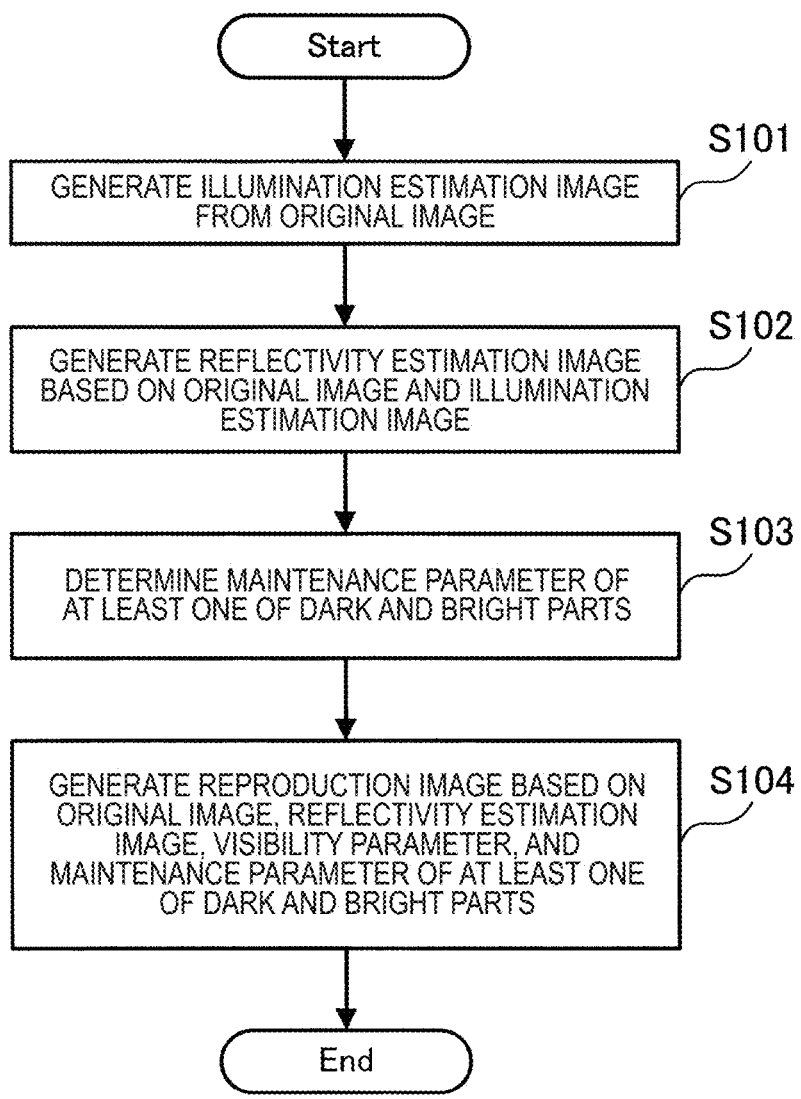
FIG. 18 is a flowchart illustrating an instance of an operation of the image processing apparatus according to the first to third exemplary embodiments of the invention.

FIG. 18 is a flowchart illustrating an instance of an operation of the image processing apparatus 10 according to the first to third exemplary embodiments of the invention. In this operation instance, a case in which the bright-dark-part maintenance parameter, the dark-part maintenance parameter, the bright-part maintenance parameter, and the like are controlled according to the visibility parameter will be described.

When an original image is input, first, the illumination estimation unit 11 generates multilayer images including plural smoothed images from the original image as illustrated in FIGS. 2 and 4 and generates an illumination estimation image using the multilayer images (step S101).

Subsequently, the reflectivity estimation unit 12 generates reflectivity estimation image based on the original image and the illumination estimation image generated in step S101 (step S102).

Subsequently, the image processing apparatus 10 determines a maintenance parameter of at least one of a dark part and a bright part (step S103).

Here, in the first exemplary embodiment, "the maintenance parameter of at least one of the dark part and the bright part" is the bright-dark-part maintenance parameter. That is, in the first exemplary embodiment, the bright-dark-part maintenance parameter determining unit 13 determines the bright-dark-part maintenance parameter based on the original image and the visibility parameter.

Moreover, in the second exemplary embodiment, "the maintenance parameter of at least one of the dark part and the bright part" is the dark-part maintenance parameter and the bright-part maintenance parameter. That is, in the second exemplary embodiment, the dark-part maintenance parameter determining unit 14 determines the dark-part maintenance parameter based on the original image and the visibility parameter, and the bright-part maintenance parameter determining unit 15 determines the bright-part maintenance parameter based on the original image and the visibility parameter.

In the third exemplary embodiment, "the maintenance parameter of at least one of the dark part and the bright part" is any one of the bright-dark-part maintenance parameter, the dark-part maintenance parameter, and the bright-part maintenance parameter. However, the user parameter determining unit 16 determines the visibility parameter according to a user interaction and determines any one of the bright-dark-part maintenance parameter, the dark-part maintenance parameter, and the bright-part maintenance parameter based on computation using the visibility parameter and the original image.

Finally, the image reproduction unit 17 generates a reproduction image based on the original image, the reflectivity estimation image generated in step S102, the visibility parameter, and the maintenance parameter of at least one of the dark part and the bright part determined in step S103 (step S104). In this instance, although the original image is used because it is assumed that the reproduction image is generated using Expression 4, the original image may not be used in step S104 when the reproduction image is generated using Expression 5.

Fourth Exemplary Embodiment

In this exemplary embodiment, the same skin-part maintenance parameter is applied to all pixels of a region (hereinafter referred to as a "skin region") corresponding to the skin of a person, extracted from an original image. In the following description, although the skin region is used as an instance of a region that generates a pseudo contour, the invention is not limited thereto.

Figure 19:
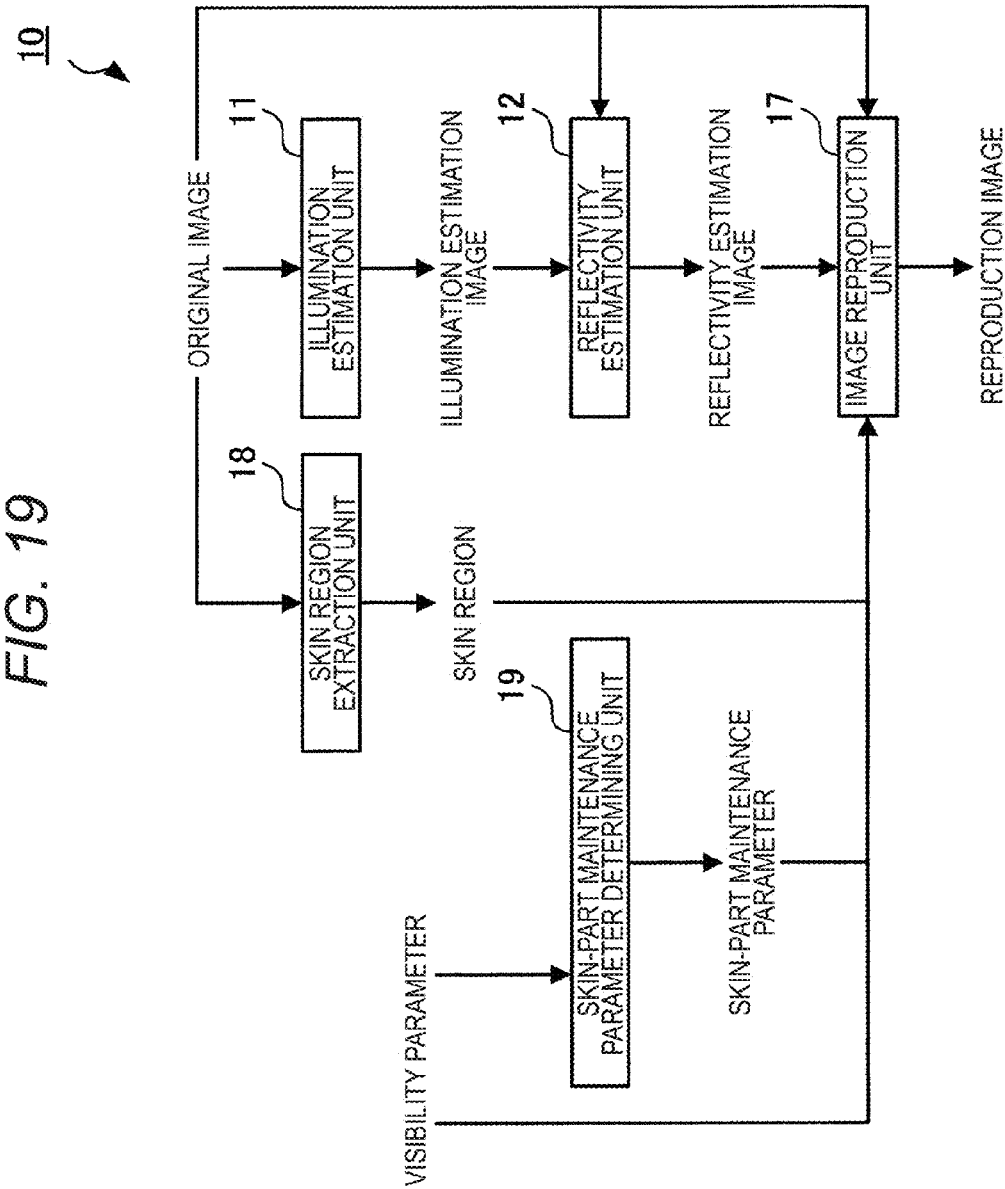
FIG. 19 is a block diagram illustrating an instance of a functional configuration of an image processing apparatus according to a fourth exemplary embodiment of the invention.

FIG. 19 is a block diagram illustrating an instance of a functional configuration of an image processing apparatus 10 according to the fourth exemplary embodiment of the invention. As illustrated in FIG. 19, the image processing apparatus 10 according to this exemplary embodiment includes an illumination estimation unit 11, reflectivity estimation unit 12, an image reproduction unit 17, a skin region extraction unit 18, and a skin-part maintenance parameter determining unit 19. Here, since the illumination estimation unit 11 and the reflectivity estimation unit 12 are the same as those of the first exemplary embodiment, the description thereof will not be provided, and the skin region extraction unit 18, the skin-part maintenance parameter determining unit 19, and the image reproduction unit 17 only will be described.

The skin region extraction unit 18 extracts a skin region of a person from an original image. The skin region may be extracted by an arbitrary method such as a method of converting an original image from a RGB color space to a HSV color space to extract pixels having pixel values close to the value of a representative skin or a method of recognizing a person by object recognition or the like and extracting the skin region using the recognition information and color information.

In this exemplary embodiment, a skin region is used as an instance of a portion of a specific color predetermined as the color that generates a pseudo contour of the original image, and the skin region extraction unit 18 is provided as an instance of an extraction unit that extracts the portion of the specific color.

More specifically, in this exemplary embodiment, a region in which a pseudo contour is likely to occur when a Retinex process is performed on an original image is specified, and a representative color of the specified region is referred to as a "specific color". The pseudo contour generally refers to a phenomenon that a color difference in an original image is enhanced by image processing to form steps and pseudo lines like a contour is generated.

In a captured image, the shades often occur in a portion of an object due to the relation between an object and a light source during photographing. In such a case, although the object is originally composed of similar colors in the captured image, a large color difference occurs in the object. In this exemplary embodiment, a region in which a large color difference occurs due to the shades in the captured image although the object is originally composed of similar colors is defined as a region in which a pseudo contour is likely to occur.

Here, various methods may be used as a method of determining the specific color (that is, a representative color in the region in which a pseudo contour is likely to occur). However, basically, the value of the "representative color" among pixels (the color values thereof) belonging to the region of the original image, in which a pseudo contour is likely to occur is determined. Thus, for instance, when a region in which a pseudo contour is likely to occur is specified as the face portion of a person and both a "sunny region" and a "shady region" are included in the region, the color of pixels belong to any one of the regions may be extracted as the "specific color". Plural methods may be used as a method of extracting a color value from the pixels as the "representative color". As an instance, a method may be considered in which the "region in which a pseudo contour is likely to occur" is determined in advance as the "skin region," a color value probable as the color indicating the skin is stored in advance, and a pixel (the color thereof) of a color value closest to the color value indicating the stored skin color is extracted as the "representative color".

For instance, due to physical characteristics of a person, shades are formed in the boundary between the neck and the outline of the face, the bent portions of the arms and the legs, and the like. In this exemplary embodiment, the "skin region" is used as the "specific color" which is the color that represents these regions. Besides the skin region, since shades are likely to occur in a solid object captured in a specific condition such as the sunlight, if the solid object is light blue, the light blue is extracted as the specific color.

The skin-part maintenance parameter determining unit 19 determines a skin-part maintenance parameter according to a visibility parameter. Specifically, when the visibility parameter is $\alpha$ and the skin-part maintenance parameter is $\delta(\alpha)$, the skin-part maintenance parameter $\delta(\alpha)$ may be expressed by Expression 19, for instance.

$$\delta(\alpha)=1-0.5\alpha \qquad \text{[Expression 19]}$$

Figure 20:
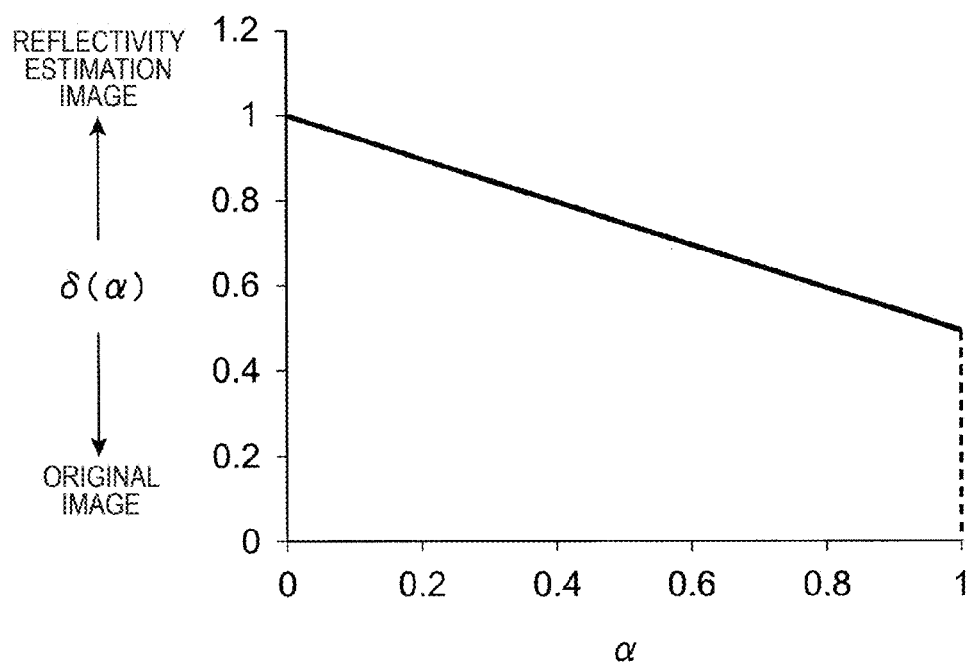
FIG. 20 is a graph illustrating an instance of the relation between a visibility parameter and a skin-part maintenance parameter determined according to the fourth exemplary embodiment of the invention.

FIG. 20 illustrates the relation between the visibility parameter $\alpha$ and the skin-part maintenance parameter $\delta(\alpha)$ in that case. Since the larger the visibility parameter $\alpha$, the more the pseudo contour of the skin region becomes noticeable, the weight of the original image is increased by decreasing $\delta(\alpha)$. An arbitrary function may be used as long as $\delta(\alpha)$ decrease as a increases.

In this exemplary embodiment, the visibility parameter is used as an instance of the degree of enhancement of the reflectivity component of the original image. Moreover, the skin-part maintenance parameter is used as an instance of a first degree of maintenance which is the degree of maintenance of the specific color portion of the original image, and the skin-part maintenance parameter determining unit 19 is provided as an instance of a first determining unit that determines the first degree of maintenance using the degree of enhancement. However, when the first degree of maintenance is high, since the weight of the original image becomes higher than that of the reflectivity estimation image in the specific color, the value of the skin-part maintenance parameter decreases.

The image reproduction unit 17 changes a process between the extracted skin region and a non-skin region. The pixel value of the skin region is calculated according to Expression 20 using the skin-part maintenance parameter $\delta(\alpha)$ determined by the skin-part maintenance parameter determining unit 19. The pixel value of the non-skin region is calculated according to Expression 21 without using $\delta(\alpha)$. Here, $0 \leq \alpha \leq 1$ and $0 \leq \delta(\alpha) \leq 1$.

$$\hat{I}(x,y)=\alpha\delta(\alpha)I_R(x,y)+(1-\alpha\delta(\alpha))I(x,y) \qquad \text{[Expression 20]}$$

$$\hat{I}(x,y)=\alpha I_R(x,y)+(1-\alpha)I(x,y) \qquad \text{[Expression 21]}$$

Here, I(x, y) represents a pixel value of an original image, an $I_R(x, y)$ represents a pixel value of an reflectivity estimation image, and Î(x, y) represents pixel value of a reproduction image. In this manner, in the skin region, the skin-part maintenance parameter $\delta(\alpha)$ of 1 or smaller is multiplied according to the visibility parameter $\alpha$. In this way, by decreasing the weight of the pixel value of the reflectivity estimation image and increasing the weight of the pixel value of the original image, the occurrence of the pseudo contour is suppressed.

In this exemplary embodiment, a reproduction image is used as an instance of an enhancement image in which the reflectivity component of the original image is enhanced, and the image reproduction unit 17 is provided as an instance of an enhancement image generation unit that generates an enhancement image.

Fifth Exemplary Embodiment

This exemplary embodiment combines the skin part maintenance, the dark part maintenance, and the bright part maintenance.

Figure 21:
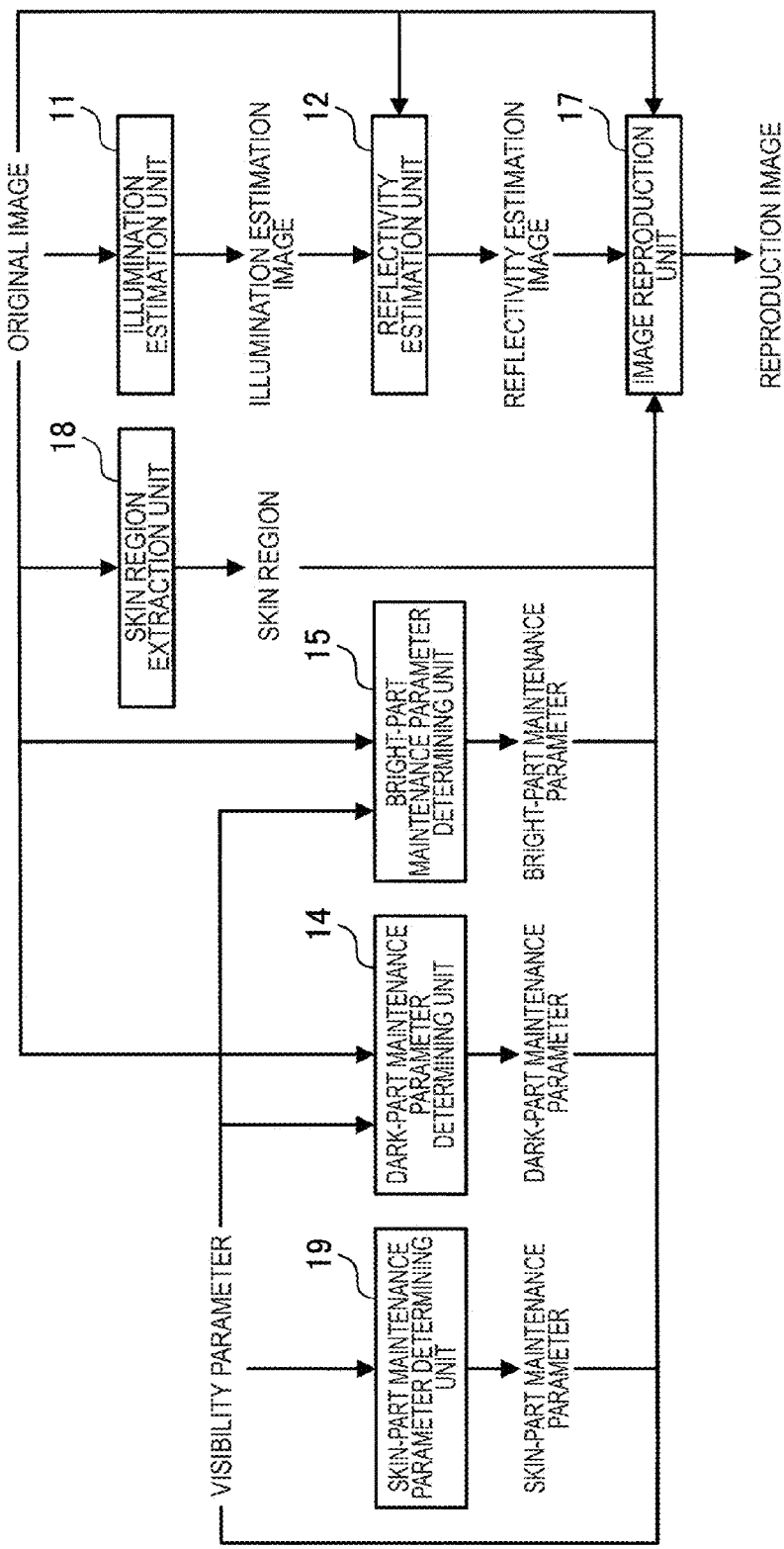
FIG. 21 is a block diagram illustrating an instance of a functional configuration of an image processing apparatus according to a fifth exemplary embodiment of the invention.

FIG. 21 is a block diagram illustrating an instance of a functional configuration of an image processing apparatus 10 according to a fifth exemplary embodiment of the invention. As illustrated in FIG. 21, the image processing apparatus 10 of this exemplary embodiment includes an illumination estimation unit 11, reflectivity estimation unit 12, a dark-part maintenance parameter determining unit 14, a bright-part maintenance parameter determining unit 15, an image reproduction unit 17, a skin region extraction unit 18, and a skin-part maintenance parameter determining unit 19. Here, the illumination estimation unit 11 and the reflectivity estimation unit 12 are the same as in the first exemplary embodiment, the dark-part maintenance parameter determining unit 14 and the bright-part maintenance parameter determining unit 15 are the same as in the second exemplary embodiment, and the skin region extraction unit 18 and the skin-part maintenance parameter determining unit 19 are the same as in the fourth exemplary embodiment, whereby the description thereof will not be repeated. Hereinafter, only the image reproduction unit 17 will be described.

The image reproduction unit 17 changes a process between the extracted skin region and a non-skin region. The pixel value of the skin region is calculated according to Expression 22 using the skin-part maintenance parameter $\delta(\alpha)$ determined by the skin-part maintenance parameter determining unit 19. The pixel value of the non-skin region is calculated according to Expression 23 without using $\delta(\alpha)$. Here, $0 \leq \alpha \leq 1$, $0 \leq \beta \leq 1$, $0 \leq \gamma \leq 1$, and $0 \leq \delta(\alpha) \leq 1$.

$$\hat{I}(x,y) = \alpha\beta(I(x,y),\alpha)\gamma(I(x,y),\alpha)\delta(\alpha)I_R(x,y) + (1-\alpha\beta(I(x,y),\alpha)\gamma(I(x,y),\alpha)\delta(\alpha))I(x,y) \quad \text{[Expression 22]}$$

$$\hat{I}(x,y) = \alpha\beta(I(x,y),\alpha)\gamma(I(x,y),\alpha)I_R(x,y) + (1-\alpha\beta(I(x,y),\alpha)\gamma(I(x,y),\alpha))I(x,y) \quad \text{[Expression 23]}$$

Here, the difference between Expressions 22 and 23 will be described with reference to FIG. 22. Since the same process as the second exemplary embodiment is performed on the non-skin region, a parameter of a function having such a shape as indicated by a solid line is determined as a final reproduction parameter. On the other hand, since $\delta(\alpha)$ is multiplied in the skin region, the contribution of the original image is increased, and a parameter of a function having such a shape as indicated by a broken line is determined as a final reproduction parameter. In this way, the pseudo contour of the skin part is also suppressed while maintaining the dark part and the bright part.

Figure 22:
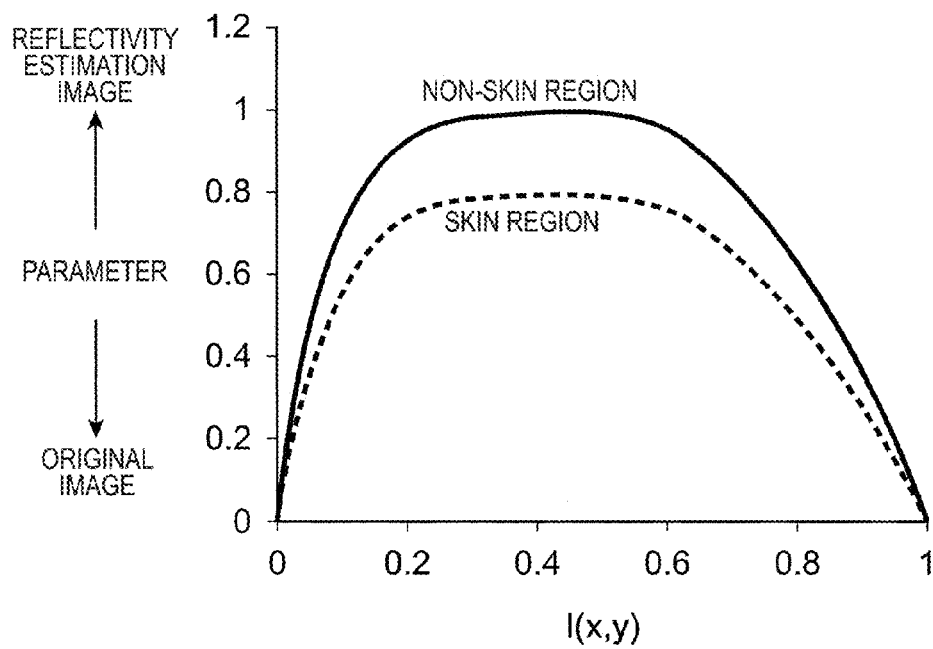
FIG. 22 is a graph illustrating an instance of the relation between a pixel value of an original image and final reproduction parameters for a skin region and a non-skin region, determined according to the fifth exemplary embodiment of the invention.
Figure 23:
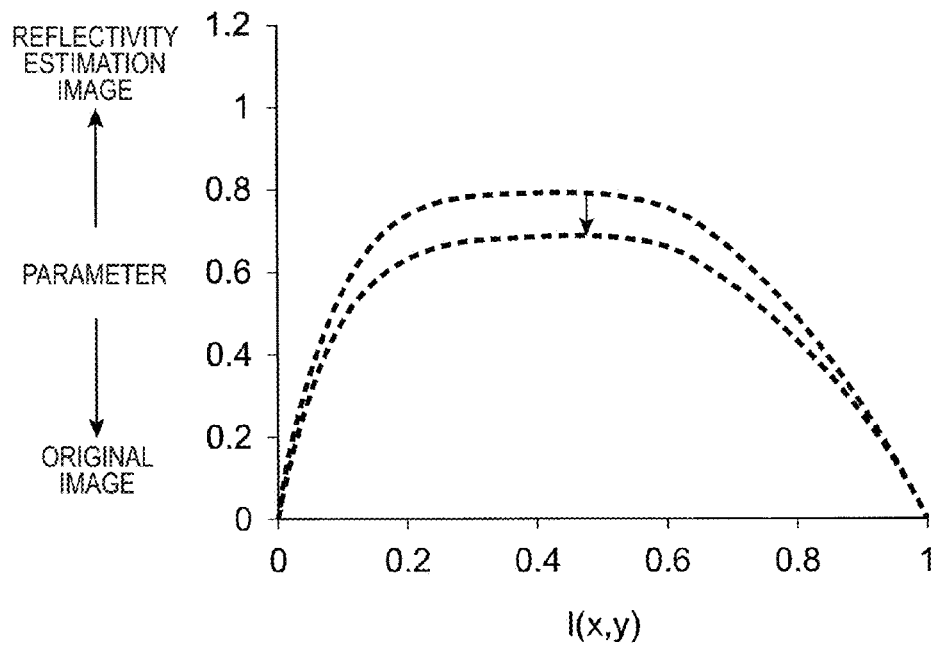
FIG. 23 is a graph illustrating how the relation between a pixel value of an original image and the final reproduction parameter for a skin region, determined according to the fifth exemplary embodiment of the invention changes according to a change in a visibility parameter.

Moreover, FIG. 23 illustrates how the shape of the function of the parameter for the skin region in FIG. 22 changes when the visibility parameter $\alpha$ is increased. In FIG. 23, the shape of the function on the lower side among the shapes of the two functions indicated by the broken line is the shape of the function when $\alpha$ was increased. Since the higher the value $\alpha$, the more the dark-part noise, the highlight clipping in the bright part, and the pseudo contour of the skin part become noticeable, the contribution of the original image is increased as indicated by an arrow. In this way, the pseudo contour of the skin part is also suppressed according to the visibility parameter $\alpha$ while maintaining the dark part and the bright part. The value $\delta(\alpha)$ may be calculated such a function that decreases as the value $\alpha$ increases like Expression 19.

In this exemplary embodiment, a reproduction image is used as an instance of an enhancement image in which the reflectivity component of the original image is enhanced, and the image reproduction unit 17 is provided as an instance of an enhancement image generation unit that generates an enhancement image.

In this exemplary embodiment, the dark-part maintenance parameter determining unit 14 and the bright-part maintenance parameter determining unit 15 are provided, and the image reproduction unit 17 generates the reproduction image that enhances the reflectivity component using the dark-part maintenance parameter and the bright-part maintenance parameter in addition to the visibility parameter and the skin-part maintenance parameter. However, the invention is not limited thereto. The bright-dark-part maintenance parameter determining unit 13 of the first exemplary embodiment may be provided instead of the dark-part maintenance parameter determining unit 14 and the bright-part maintenance parameter determining unit 15, and the image reproduction unit 17 may generate the reproduction image that enhances the reflectivity component using the bright-dark-part maintenance parameter in addition to the visibility parameter and the skin-part maintenance parameter. Alternatively, any one of the dark-part maintenance parameter determining unit 14 and the bright-part maintenance parameter determining unit 15 may be provided, and the image reproduction unit 17 may generate the reproduction image that enhances the reflectivity component using any one of the dark-part maintenance parameter and the bright-part maintenance parameter in addition to the visibility parameter and the skin-part maintenance parameter. In this respect, the dark-part maintenance parameter and the bright-part maintenance parameter are an instance of a second degree of maintenance which is the degree of maintenance of at least one of the dark part and the bright part of the original image, and the dark-part maintenance parameter determining unit 14 and the bright-part maintenance parameter determining unit 15 are an instance of a second determining unit that determines the second degree of maintenance using the degree of enhancement of the original image.

Operation of Fourth and Fifth Exemplary Embodiments

Figure 24:
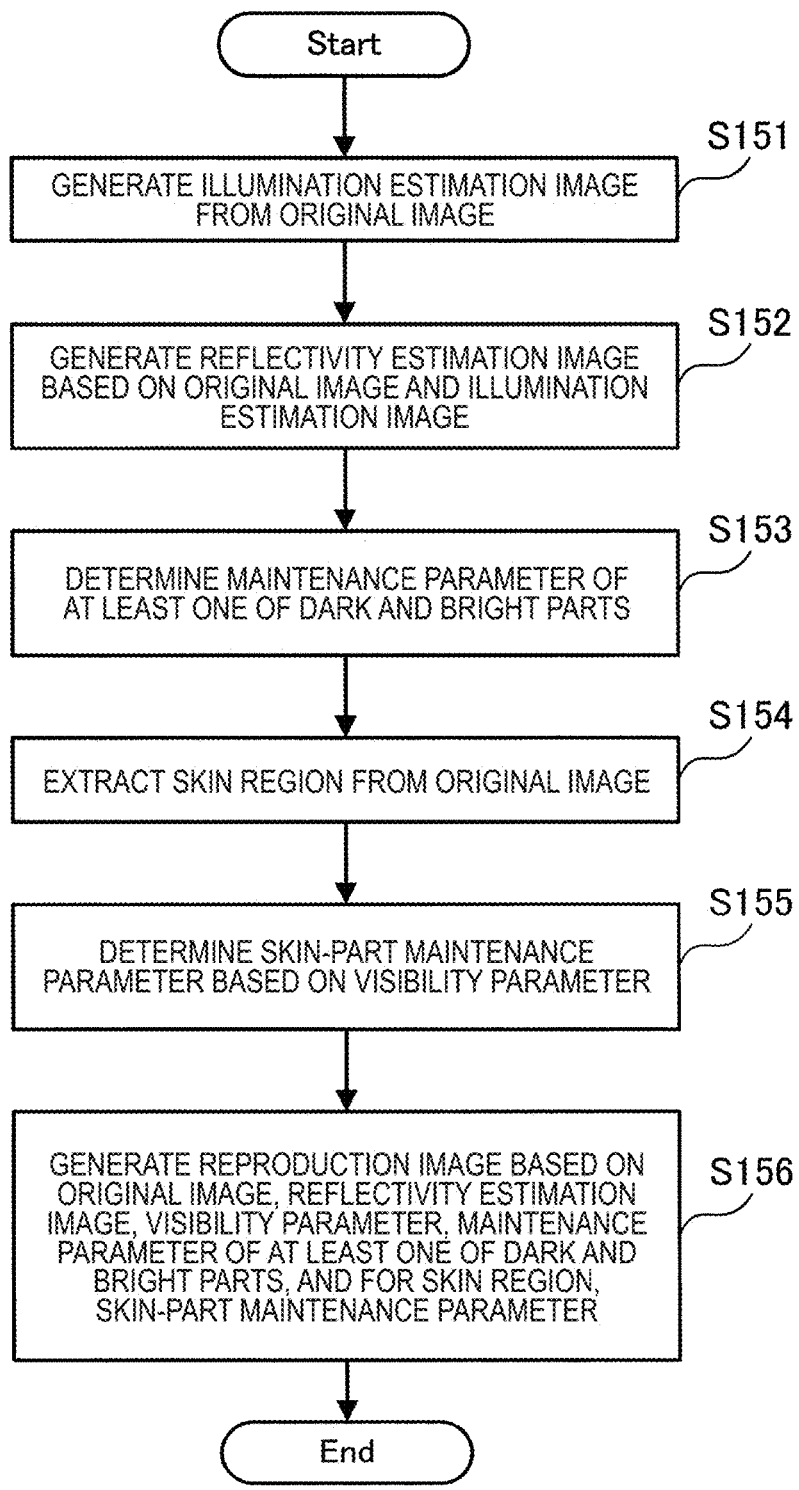
FIG. 24 is a flowchart illustrating an instance of an operation of the image processing apparatus according to the fourth and fifth exemplary embodiments of the invention.

FIG. 24 is a flowchart illustrating an instance of an operation of the image processing apparatus 10 according to the fourth and fifth exemplary embodiments. In this operation instance, a case in which the bright-dark-part maintenance parameter, the dark-part maintenance parameter, the bright-part maintenance parameter, and the like are controlled according to the visibility parameter will be described.

When an original image is input, first, the illumination estimation unit 11 generates multilayer images including plural smoothed images from the original image as illustrated in FIGS. 2 and 4 and generates an illumination estimation image using the multilayer images (step S151).

Subsequently, the reflectivity estimation unit 12 generates reflectivity estimation image based on the original image and the illumination estimation image generated in step S151 (step S152).

Subsequently, the image processing apparatus 10 determines a maintenance parameter of at least one of a dark part and a bright part (step S153).

However, this step S153 is not executed in the fourth exemplary embodiment.

In the fifth exemplary embodiment, "the maintenance parameter of at least one of the dark part and the bright part" is the dark-part maintenance parameter and the bright-part maintenance parameter. That is, in the fifth exemplary embodiment, the dark-part maintenance parameter determining unit 14 determines the dark-part maintenance parameter based on the original image and the visibility parameter, and the bright-part maintenance parameter determining unit 15 determines the bright-part maintenance parameter based on the original image and the visibility parameter.

In a modification in which the bright-dark-part maintenance parameter determining unit 13 of the first exemplary embodiment is provided instead of the dark-part maintenance parameter determining unit 14 and the bright-part maintenance parameter determining unit 15 of the fifth exemplary embodiment, "the maintenance parameter of at least one of the dark part and the bright part" is the bright-dark-part maintenance parameter. That is, in this modification of the fifth exemplary embodiment, the bright-dark-part maintenance parameter determining unit 13 determines the bright-dark-part maintenance parameter based on the original image and the visibility parameter.

Subsequently, the skin region extraction unit 18 extracts the skin region from the original image (step S154).

Subsequently, the skin-part maintenance parameter determining unit 19 determines the skin-part maintenance parameter based on the visibility parameter (step S155).

Finally, the image reproduction unit 17 generates a reproduction image based on the original image, the reflectivity estimation image generated in step S152, the visibility parameter, the maintenance parameter of at least one of the dark part and the bright part determined in step S153, and for the skin region, the skin-part maintenance parameter determined in step S155 (step S156). In this instance, although the original image is used because it is assumed that the reproduction image is generated using Expression 4, the original image may not be used in step S156 when the reproduction image is generated using Expression 5.

[Hardware Configuration of Image Processing Apparatus]

The image processing apparatus 10 of this exemplary embodiment may be realized as image processing software installed in a PC, for instance, but typically, is realized as the image processing apparatus 10 that performs image reading and image formation.

Figure 25:
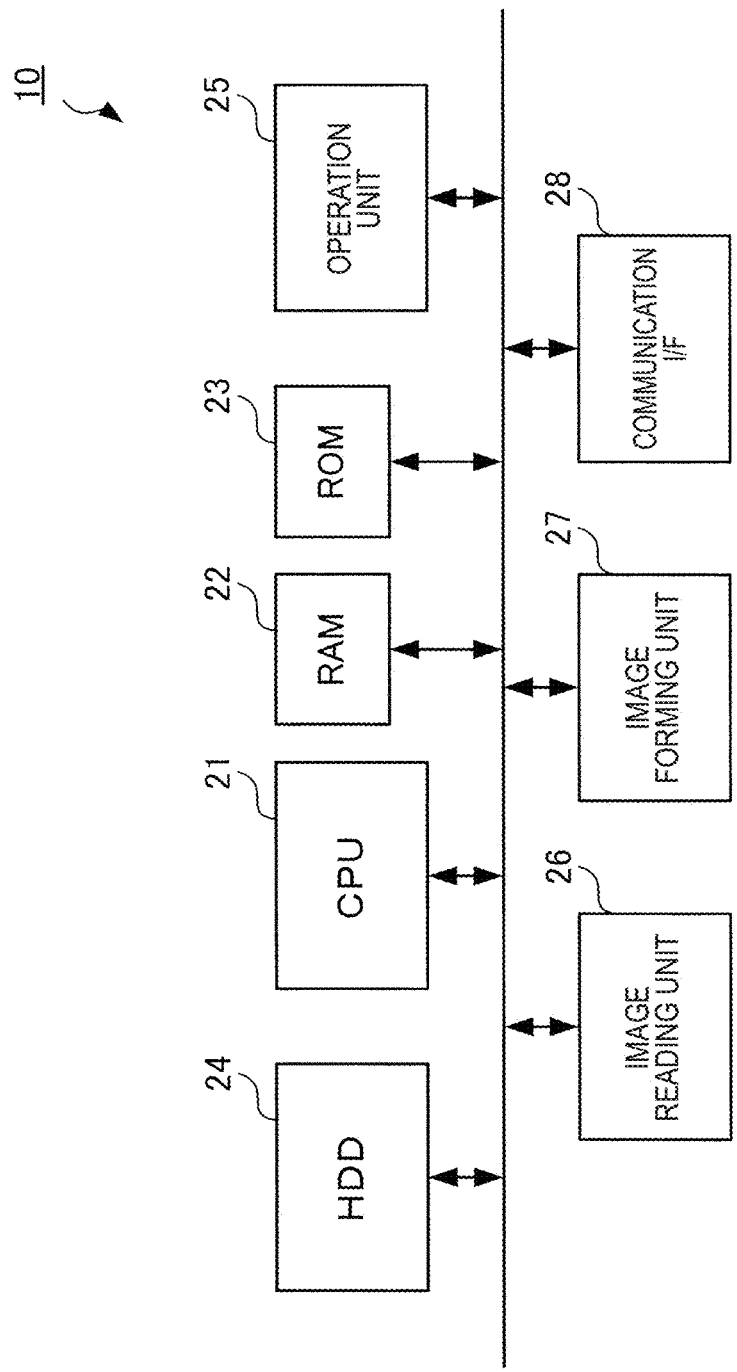
FIG. 25 is a block diagram illustrating an instance of a hardware configuration of the image processing apparatus according to the exemplary embodiment of the invention.

FIG. 25 is a block diagram illustrating an instance of a hardware configuration of the image processing apparatus 10. As illustrated in FIG. 25, the image processing apparatus 10 includes a central processing unit (CPU) 21, a random access memory (RAM) 22, a read only memory (ROM) 23, a hard disk drive (HDD) 24, an operation panel 25, an image reading unit 26, an image forming unit 27, and a communication interface (hereinafter, referred to as a "communication I/F") 28.

The CPU 21 loads various programs stored in the ROM 23 or the like onto the RAM 22 to execute the programs, thereby executing various functions to be described below.

The RAM 22 is used as a work memory or the like of the CPU 21.

The ROM 23 is a memory that stores various programs executed by the CPU 21.

The HDD 24 is a magnetic disk device, for instance, which stores image data read by the image reading unit 26, or image data or the like used for image formation in the image forming unit 27.

The operation panel 25 is a touch panel on which a variety of information is displayed or an operation input of a user is received. Here, the operation panel 25 includes a display on which the variety of information is displayed, and a position detection sheet that detects a position indicated by a finger, a stylus pen or the like.

The image reading unit 26 reads an image recorded on a recording medium such as a sheet. Here, the image reading unit 26 is a scanner, for instance, which may employ a CCD type in which reflection light with respect to light irradiated onto an original document from a light source is reduced by a lens and is received by a charge coupled device (CCD), or a CIS type in which reflection light with respect to light sequentially irradiated onto an original document from an LED light source is received by a contact image sensor (CIS).

The image forming unit 27 forms an image onto a recording medium. Here, the image forming unit 27 is a printer, for instance, which may employ an electrophotographic system in which toner attached on a photoconductor is transferred onto the recording medium to form an image, or an ink jet system in which ink is ejected onto the recording medium to form an image.

The communication I/F 28 transmits and receives a variety of information between the image processing apparatus 10 and another apparatus through a network.

A program for realizing this exemplary embodiments may be provided through a communication device, or may be provided in a state of being stored in a recording medium such as a CD-ROM.

What is claimed is:

1. An image processing apparatus comprising:
a memory configured to store instructions; and
a processor configured to execute, in response to being loaded with the instructions from the memory:
reflectivity image generation to generate a reflectivity image in which a reflectivity component of an original image is used as a pixel value, from the original image;
maintenance degree determination to determine a degree of maintenance of at least one of a dark part and a bright part of the original image using the original image and a degree of enhancement of the reflectivity component of the original image; and
enhancement image generation to generate an enhancement image in which the reflectivity component of the original image is enhanced using the reflectivity image, the degree of enhancement, and the degree of maintenance,
wherein the maintenance degree determination comprises determining the degree of maintenance so that a higher degree of enhancement corresponds to a higher degree of maintenance.

2. The image processing apparatus according to claim 1, wherein the maintenance degree determination further comprises determining a bright-dark part maintenance degree which is the degrees of maintenance of the dark part and the bright part of the original image as the degree of maintenance.

3. The image processing apparatus according to claim 2, wherein the maintenance degree determination further comprises determining the bright-dark part maintenance degree so that a darker pixel of the original image corresponds to a higher bright-dark part maintenance degree, and so that a brighter pixel of the original image corresponds to a higher bright-dark part maintenance degree.

4. The image processing apparatus according to claim 2, wherein the maintenance degree determination further comprises determining the bright-dark part maintenance degree so that a higher degree of enhancement corresponds to a higher bright-dark part maintenance degree.

5. The image processing apparatus according to claim 1, wherein the maintenance degree determination further comprises determining a dark-part maintenance degree which is the degree of maintenance of the dark part of the original image and a bright-part maintenance degree which is the degree of maintenance of the bright part of the original image as the degree of maintenance.

6. The image processing apparatus according to claim 5, wherein the maintenance degree determination further comprises:
  determining the dark-part maintenance degree so that a darker pixel of the original image corresponds to a higher dark-part maintenance degree, and
  determining the bright-part maintenance degree so that a brighter pixel of the original image corresponds to a higher bright-part maintenance degree.

7. The image processing apparatus according to claim 1 wherein the processor is further configured to execute:
  setting the degree of enhancement correlated in advance with an operation that an operator performs on a screen.

8. A non-transitory computer readable medium storing a program causing a computer to execute a process for image processing, the process comprising:
  generating a reflectivity image in which a reflectivity component of an original image is used as a pixel value, from the original image;
  determining a degree of maintenance of at least one of a dark part and a bright part of the original image using the original image and a degree of enhancement of the reflectivity component of the original image; and
  generating an enhancement image in which the reflectivity component of the original image is enhanced using the reflectivity image, the degree of enhancement, and the degree of maintenance,
  wherein the degree of maintenance is determined so that a higher degree of enhancement corresponds to a higher degree of maintenance.

9. An image processing method comprising:
  generating a reflectivity image in which a reflectivity component of an original image is used as a pixel value, from the original image;
  determining a degree of maintenance of at least one of a dark part and a bright part of the original image using the original image and a degree of enhancement of the reflectivity component of the original image; and
  generating an enhancement image in which the reflectivity component of the original image is enhanced using the reflectivity image, the degree of enhancement, and the degree of maintenance,
  wherein the degree of maintenance is determined so that a higher degree of enhancement corresponds to a higher degree of maintenance.

10. An image processing apparatus comprising:
  a memory configured to store instructions; and
  a processor configured to execute, in response to being loaded with the instructions from the memory:
    reflectivity image generation to generate a reflectivity image in which a reflectivity component of an original image is used as a pixel value, from the original image;
    first maintenance degree determination to determine a first degree of maintenance which is a degree of maintenance of a portion of a specific color predetermined as a color that generates a pseudo contour of the original image using a degree of enhancement of the reflectivity component of the original image; and
    enhancement image generation to generate an enhancement image in which the reflectivity component of the original image is enhanced using the reflectivity image, the degree of enhancement, and the first degree of maintenance.

11. The image processing apparatus according to claim 10,
  wherein the processor is further configured to execute color extraction to extract the portion of the specific color from the original image, and
  wherein the enhancement image generation further comprises generating the enhancement image in which the portion of the specific color of the original image is enhanced using the first degree of maintenance and portions other than the portion of the specific color of the original image are not enhanced using the first degree of maintenance.

12. The image processing apparatus according to claim 10, wherein the first maintenance degree determination further comprises determining the first degree of maintenance so that a higher degree of enhancement corresponds to a higher first degree of maintenance.

13. The image processing apparatus according to claim 10,
  wherein the processor is further configured to execute second maintenance degree determination to determine a second degree of maintenance which is a degree of maintenance of at least one of the dark part and the bright part of the original image using the original image and the degree of enhancement, and
  wherein the enhancement image generation further comprises generating the enhancement image using further the second degree of maintenance.

14. A non-transitory computer readable medium storing a program causing a computer to execute a process for image processing, the process comprising:
  generating a reflectivity image in which a reflectivity component of an original image is used as a pixel value, from the original image;
  determining a first degree of maintenance which is a degree of maintenance of a portion of a specific color predetermined as a color that generates a pseudo contour of the original image using a degree of enhancement of the reflectivity component of the original image; and
  generating an enhancement image in which the reflectivity component of the original image is enhanced using the reflectivity image, the degree of enhancement, and the first degree of maintenance.

15. An image processing method comprising:
  generating a reflectivity image in which a reflectivity component of an original image is used as a pixel value, from the original image;
  determining a first degree of maintenance which is a degree of maintenance of a portion of a specific color predetermined as a color that generates a pseudo contour of the original image using a degree of enhancement of the reflectivity component of the original image; and
  generating an enhancement image in which the reflectivity component of the original image is enhanced using the reflectivity image, the degree of enhancement, and the first degree of maintenance.

* * * * *